United States Patent [19]

French et al.

[11] Patent Number: 5,286,129
[45] Date of Patent: Feb. 15, 1994

[54] COUPLING DEVICE AND METHODS OF COUPLING

[75] Inventors: Philip D. French, Mount Vernon, Me.; Charles R. Monty, Granby; Steven P. Van Keuren, Wilton, both of Conn.

[73] Assignee: Crater Corporation, Granby, Conn.

[21] Appl. No.: 740,579

[22] Filed: Aug. 7, 1991

[51] Int. Cl.$^5$ .................................................. F16D 1/10
[52] U.S. Cl. .................................. 403/24; 403/143; 403/319; 403/323; 403/353; 285/265; 137/15; 137/315
[58] Field of Search ................ 403/127–128, 403/122–123, 141, 143, 76–77, 24, 82, 344, 353, 355, 341, 205, 174, 178, 319, 323, 11, 20; 285/264–265, 403, 325; 29/898.043–898.053; 251/367; 137/15, 315

[56] References Cited

U.S. PATENT DOCUMENTS

| | | | |
|---|---|---|---|
| 424,572 | 4/1890 | Painter | 403/123 |
| 2,086,001 | 7/1937 | Shaw | 251/367 X |
| 2,326,143 | 8/1943 | Hufferd | 284/4 |
| 2,334,875 | 11/1943 | Hufferd | 284/4 |
| 2,357,232 | 8/1944 | Snyder et al. | 284/4 |
| 2,376,803 | 5/1945 | Mower et al. | 284/4 |
| 2,440,946 | 5/1948 | Hansen | 137/69 |
| 2,458,899 | 1/1949 | Doubrava | 284/4 |
| 2,712,454 | 7/1955 | Love | 284/4 |
| 2,948,553 | 8/1960 | Gill et al. | 284/4 |
| 2,982,296 | 5/1961 | Ohls et al. | 137/246.12 |
| 2,991,090 | 7/1961 | De Cenzo | 284/18 |
| 3,078,068 | 2/1963 | Romney | 251/149.2 |
| 3,159,180 | 12/1964 | Courtot et al. | 137/614.06 |
| 3,167,092 | 1/1965 | Kelly et al. | 137/614.06 |
| 3,279,497 | 10/1966 | Norton et all | 137/614.03 |
| 3,341,230 | 9/1967 | Wichers | 403/127 X |
| 3,382,892 | 5/1968 | Cerbin | 137/614.02 |
| 3,423,063 | 1/1969 | German | 251/149.6 |
| 3,423,089 | 1/1969 | Andis | 403/98 X |
| 3,431,751 | 3/1969 | Stokely | 403/128 X |
| 3,433,510 | 3/1969 | Hulterstrum | 403/90 X |
| 3,545,490 | 12/1970 | Burrus | 137/614.06 |
| 3,921,656 | 11/1975 | Meisenheimer, Jr. | 137/68 |
| 4,181,149 | 1/1980 | Cox | 137/614.02 |
| 4,212,321 | 7/1980 | Hulsey | 137/625.32 |
| 4,335,747 | 6/1982 | Mitsumoto et al. | 137/614.06 |
| 4,338,038 | 7/1982 | Cloarec | 403/76 X |
| 4,438,779 | 3/1984 | Allread | 137/614.06 |
| 4,445,664 | 5/1984 | Allread | 251/149.2 |
| 4,467,823 | 8/1984 | Shaffer et al. | 137/15 |
| 4,473,211 | 9/1984 | Fremy | 251/149.2 |
| 4,627,598 | 12/1986 | Fremy | 251/149.2 |
| 4,664,149 | 5/1987 | Fremy | 137/16 L |
| 4,665,937 | 5/1987 | Hall | 137/15 |

Primary Examiner—Randolph A. Reese
Assistant Examiner—Harry C. Kim
Attorney, Agent, or Firm—Paul R. Audet

[57] ABSTRACT

Coupling devices have a housing comprised of first and second housing parts together forming an interior cavity which houses a rotatable coupler, preferably comprised of first and second coupler segments, the device being coupled or not depending upon the coupler's position within the cavity. Each housing part has one or more concave cavity wall portion(s) for rotatably retaining the coupler or a coupler segment in the cavity or in a housing part cavity portion. The coupler or each segment has one or more convex outer surface wall portion(s). The concave cavity wall portion(s) slip fit engage the coupler or coupler segment convex surface wall portions and rotatably retain the coupler or segment(s) within the housing cavity or housing part cavity portion. The housing parts are uncoupled and partable when the coupler is in a first position which allows their mating and parting, and they are coupled and not partable when the coupler or segments is or are in a second position wherein one or more of its or their convex surface wall portions is or are slip fit engaged by the coupler retaining concave cavity wall portion(s) of each of the first and second housing parts. The housing parts and coupler segments respectively have and are mated along mating/parting lines, which preferably have substantially the same configuration. The housing parts are uncoupled and partable when the mating/parting lines positionally substantially correspond and are coupled when the mating/parting lines do not. Methods of coupling are included.

59 Claims, 12 Drawing Sheets

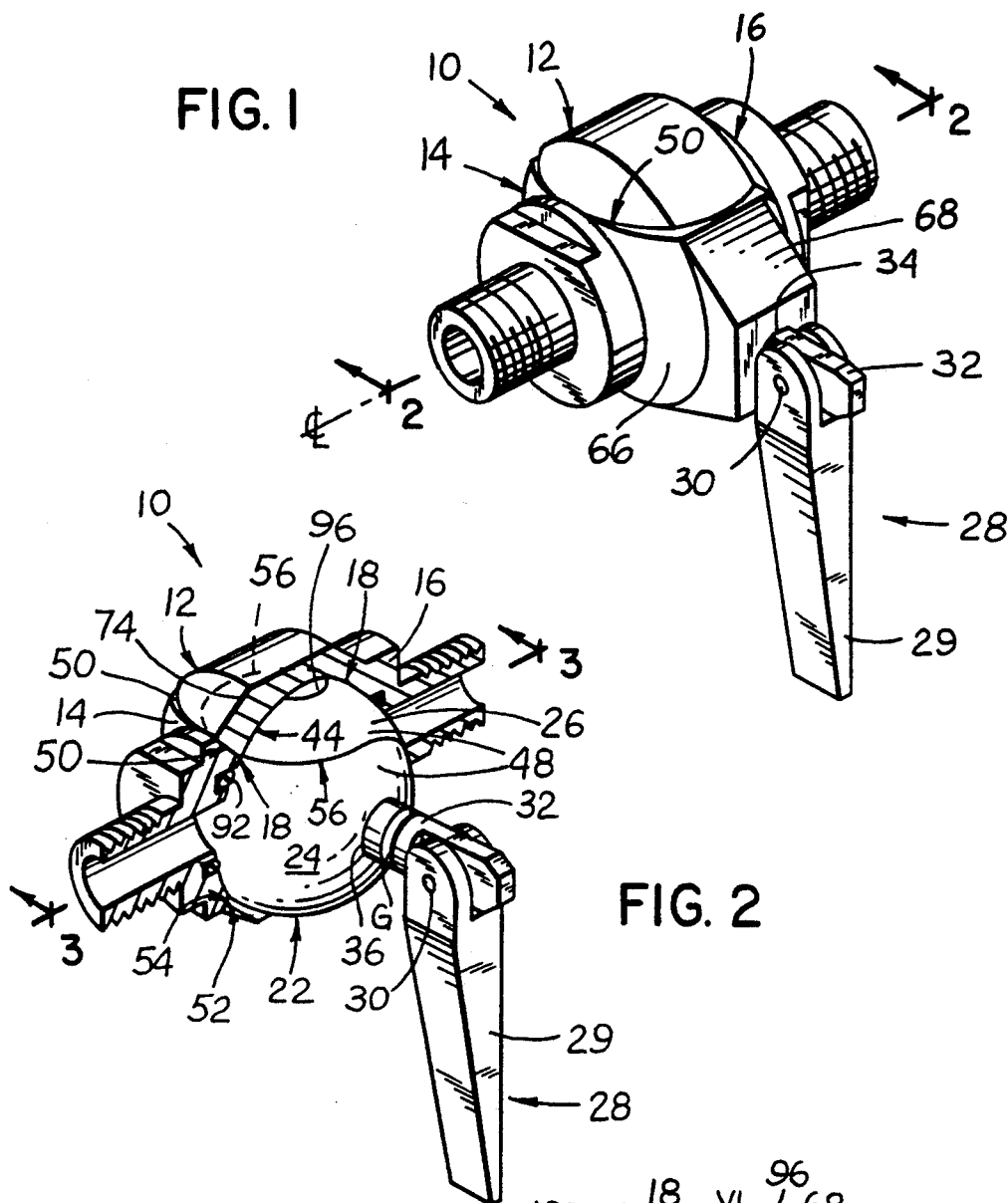
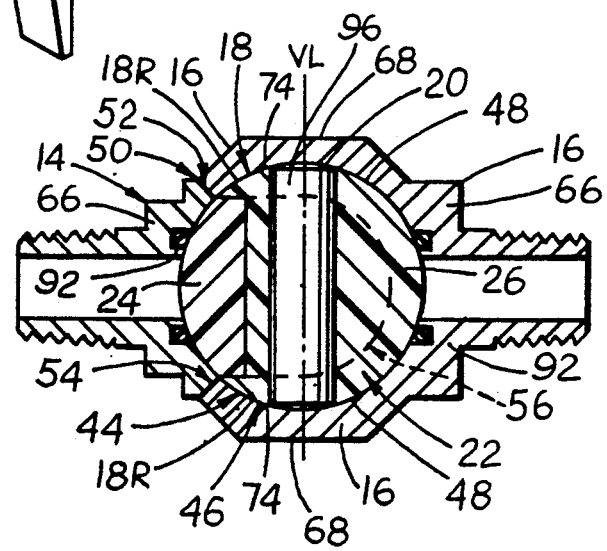
FIG. 1
FIG. 2
FIG. 3

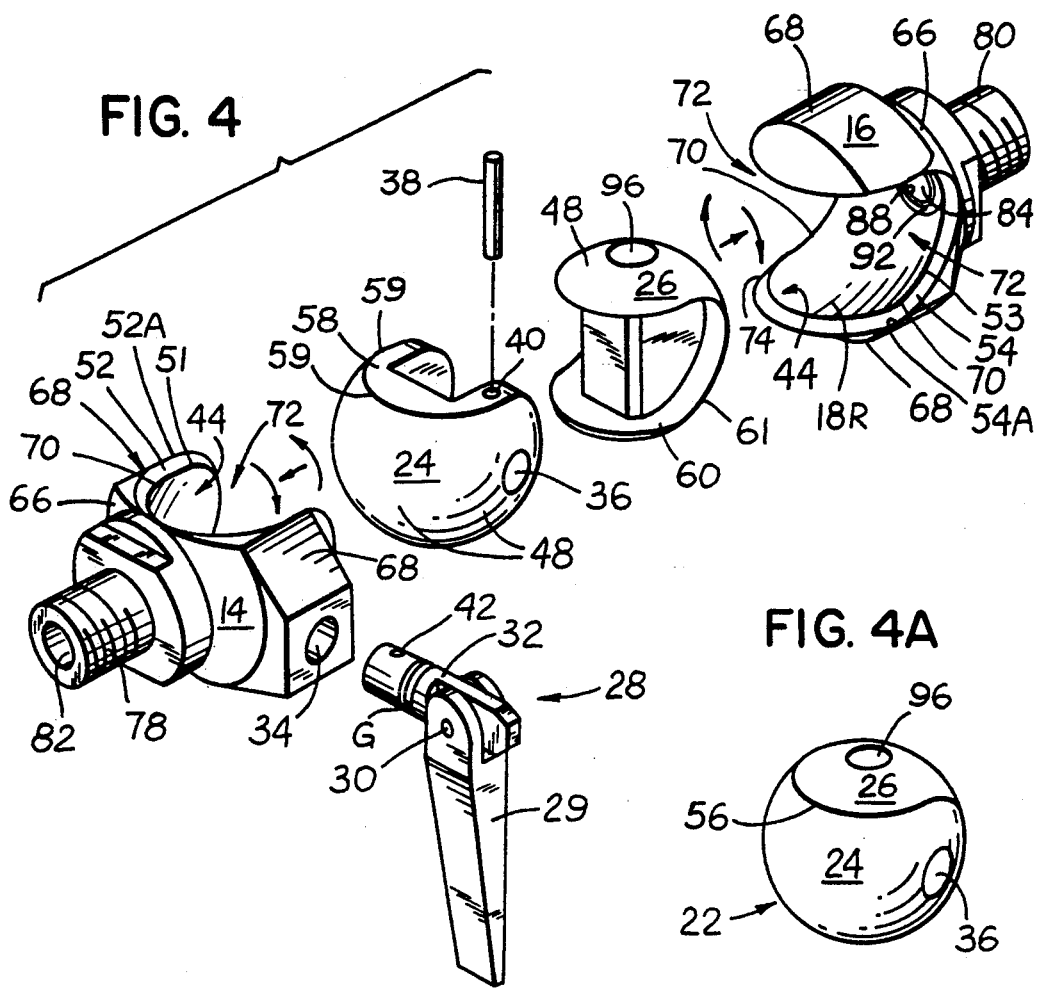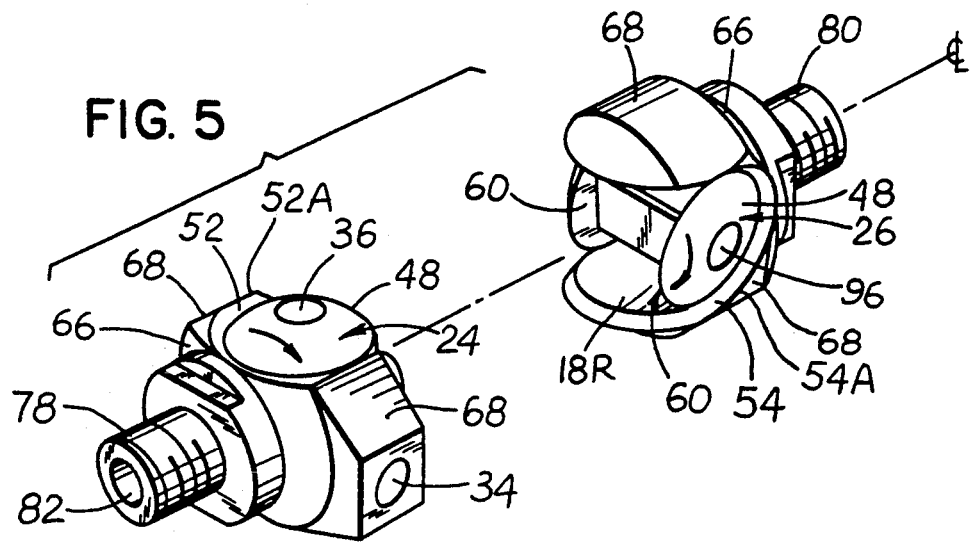

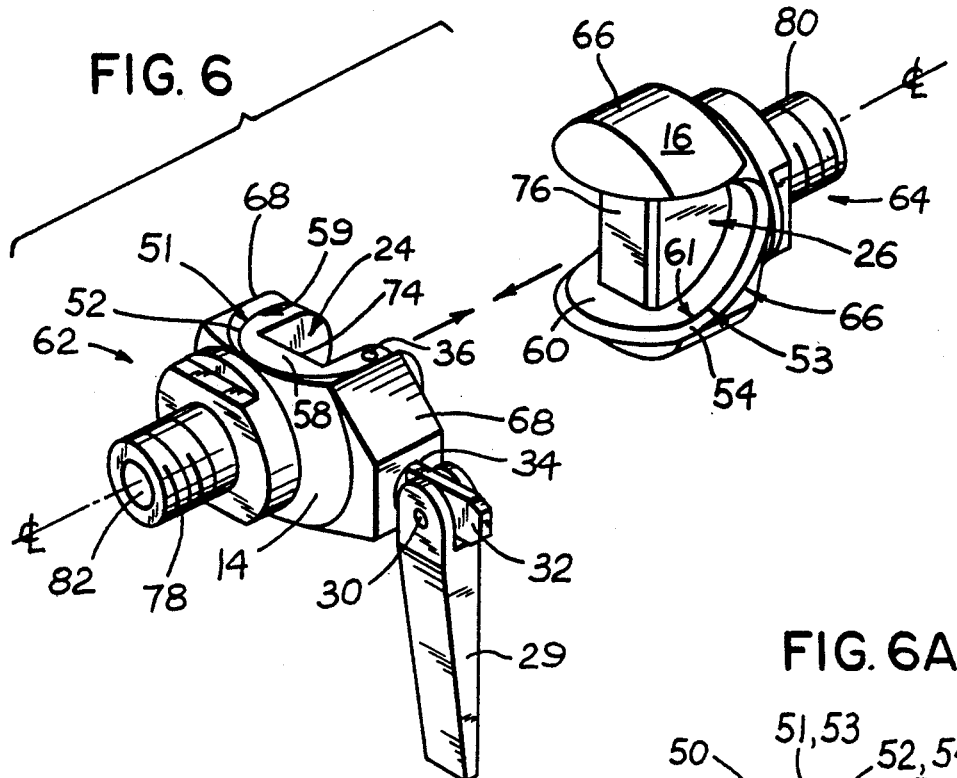

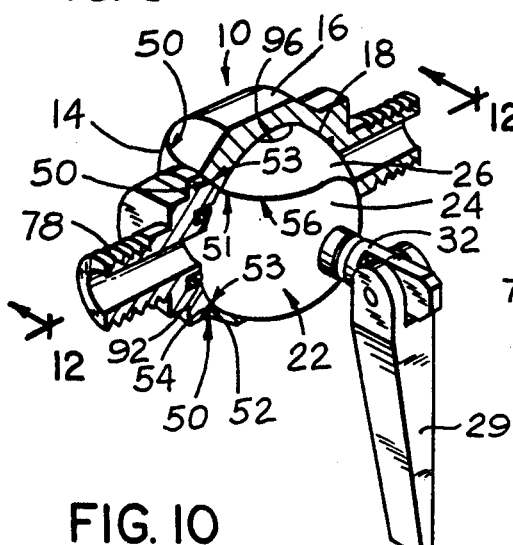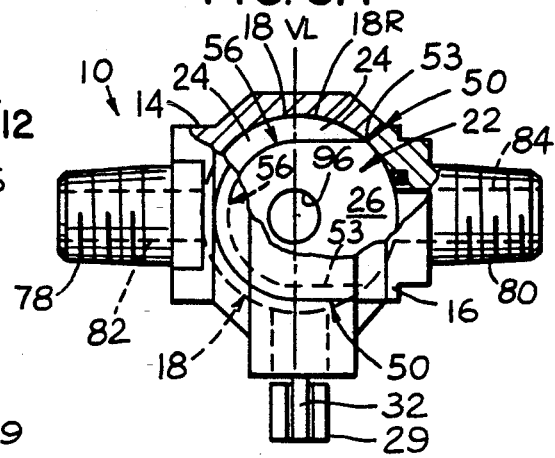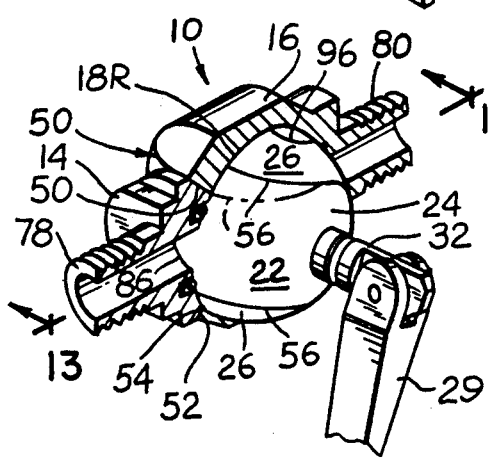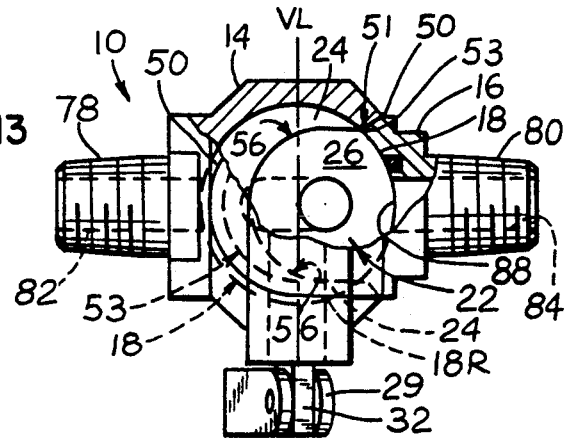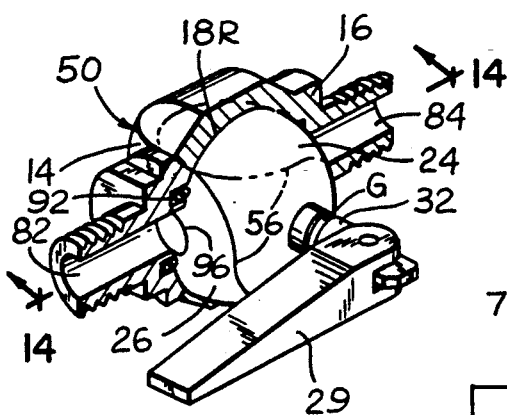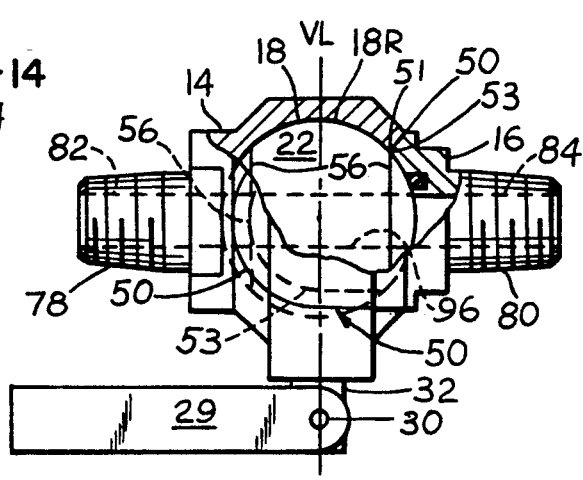

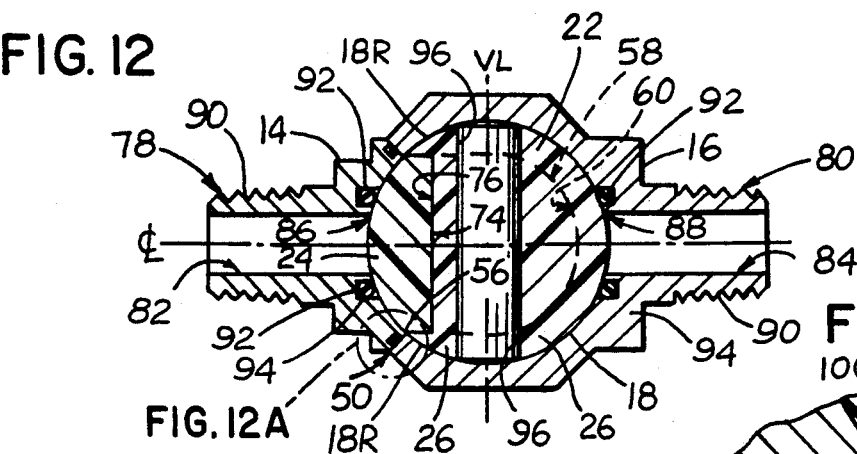
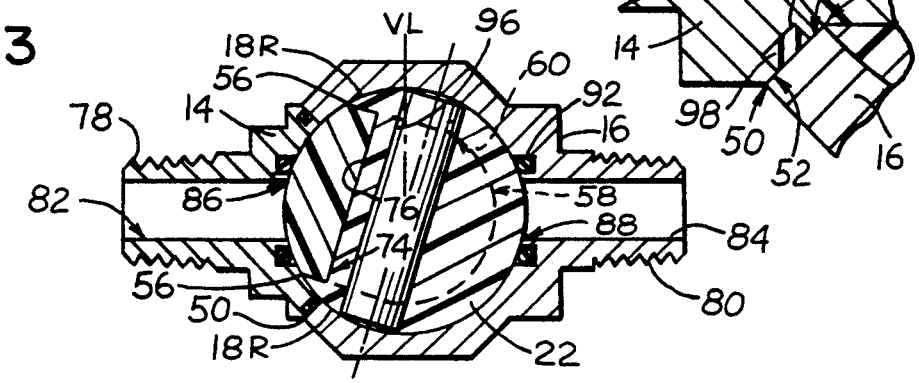
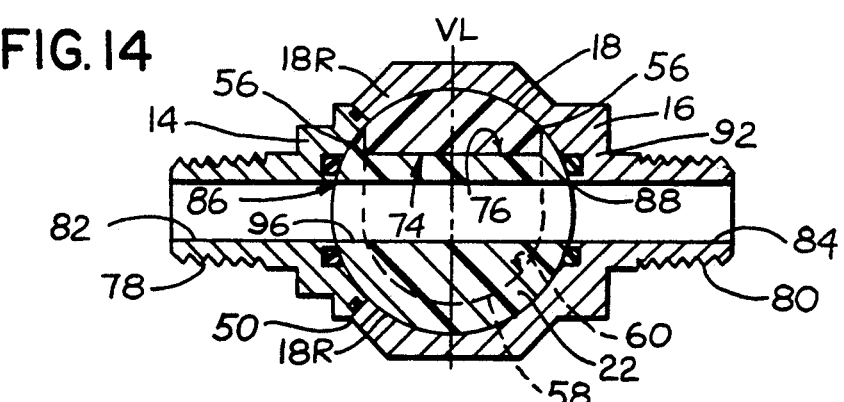
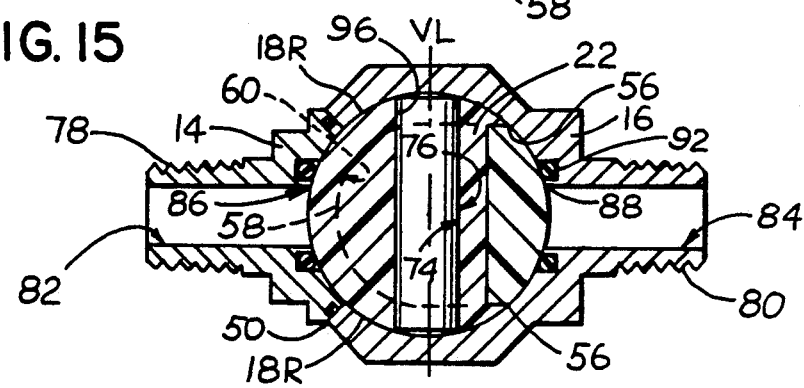

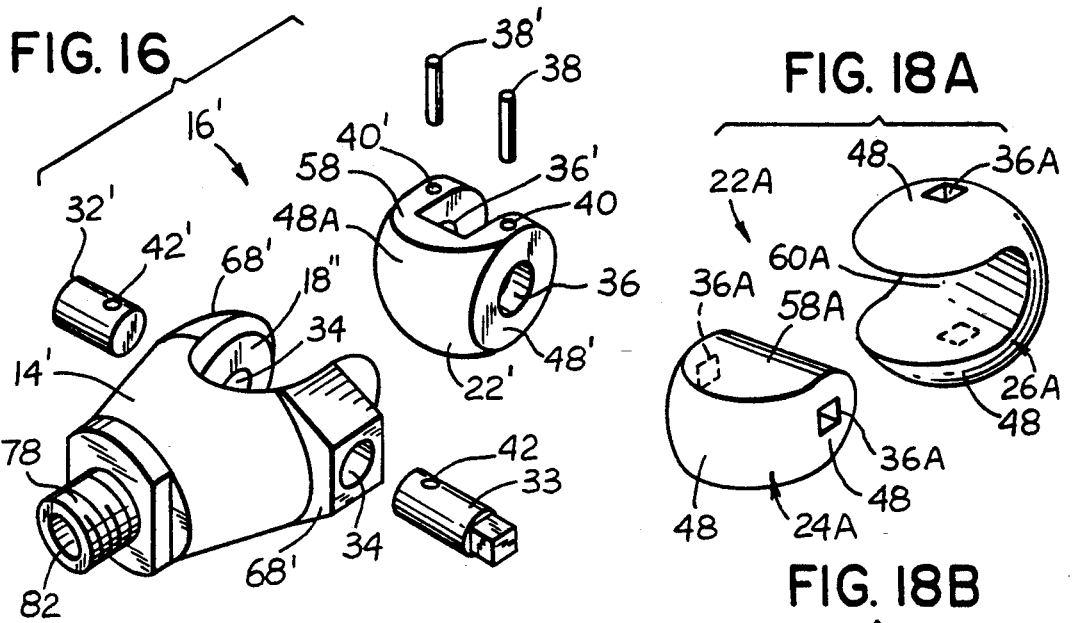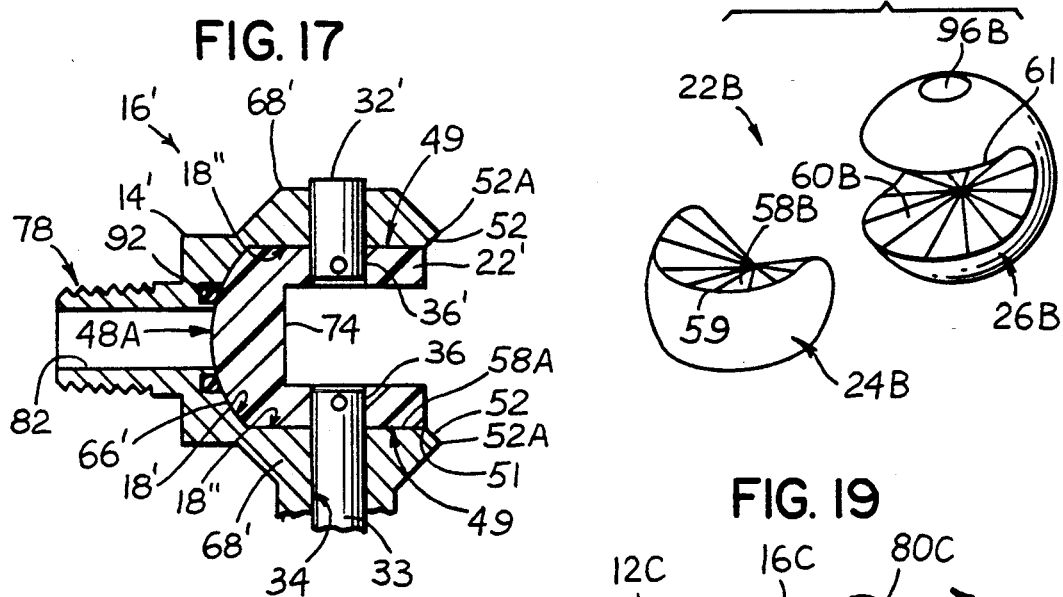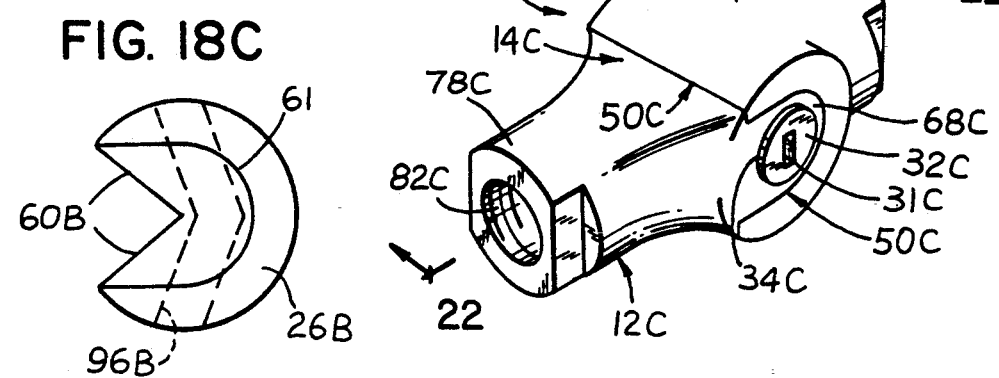

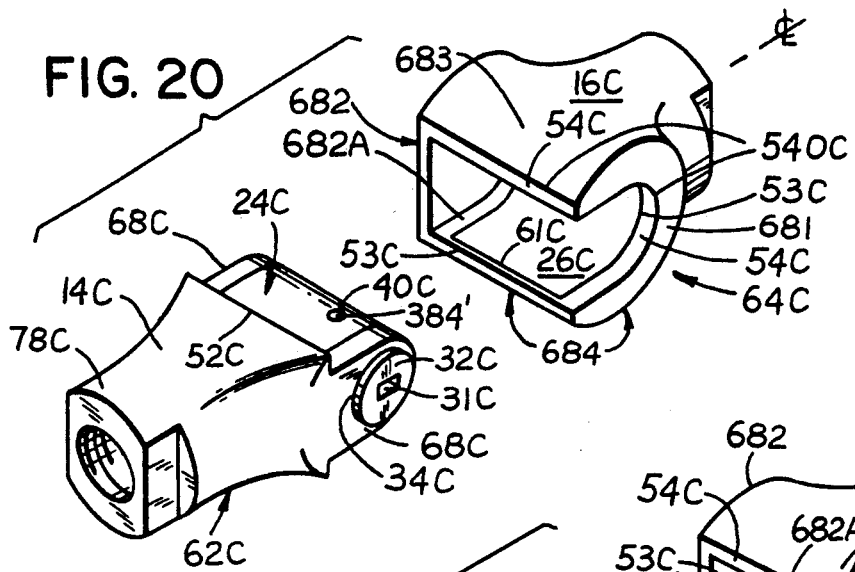
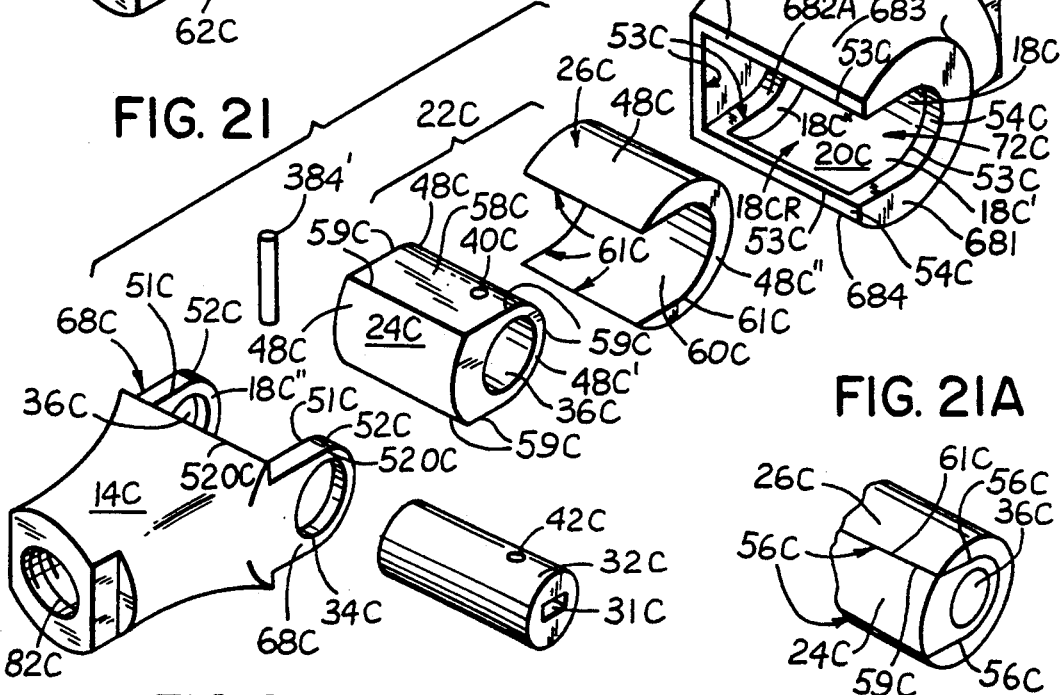
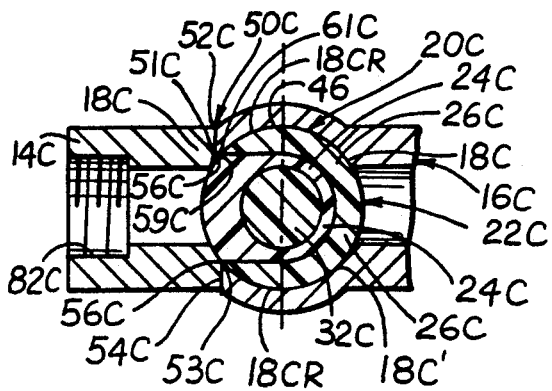
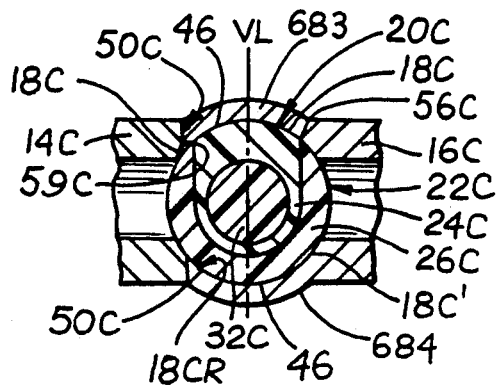

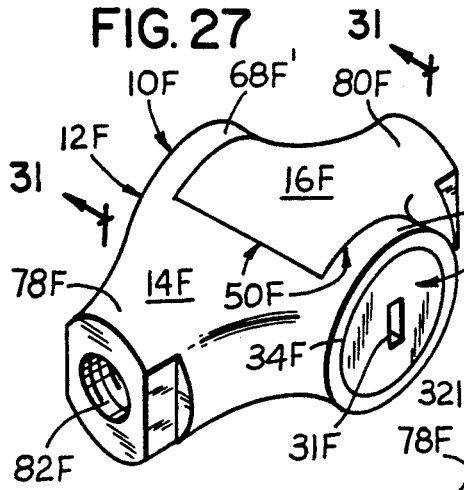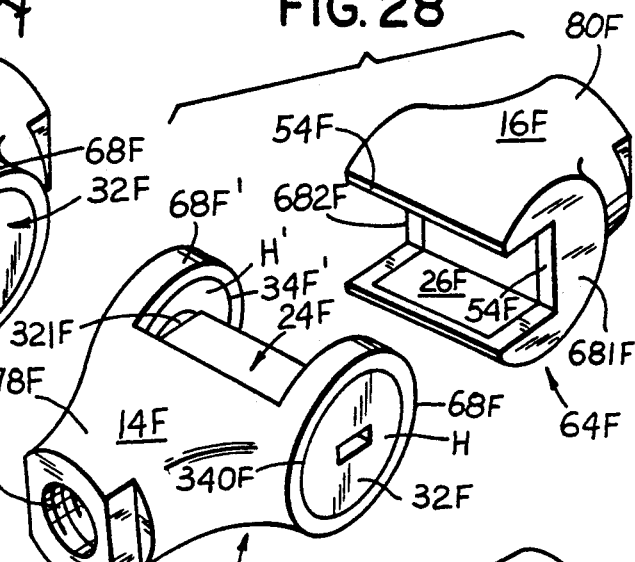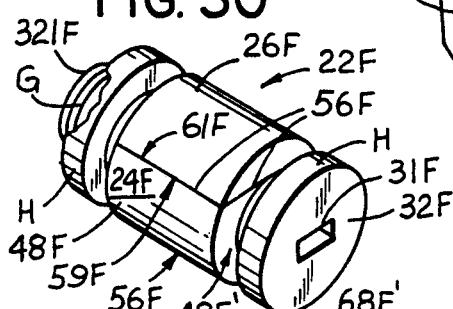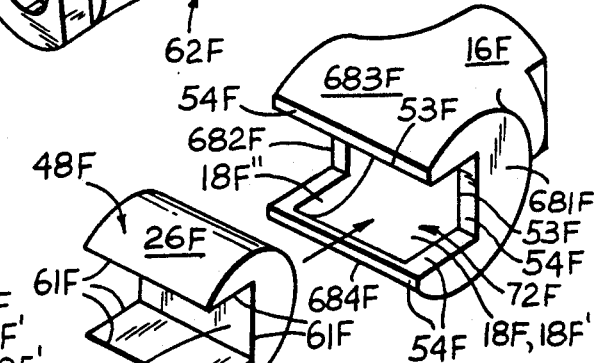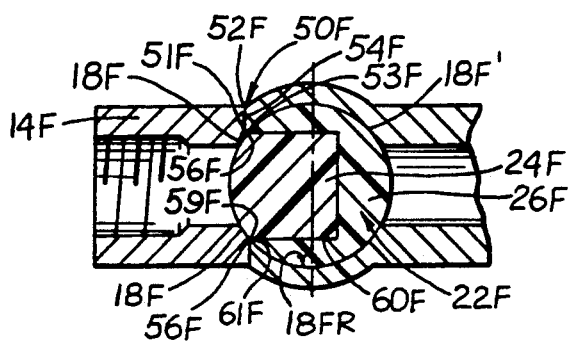

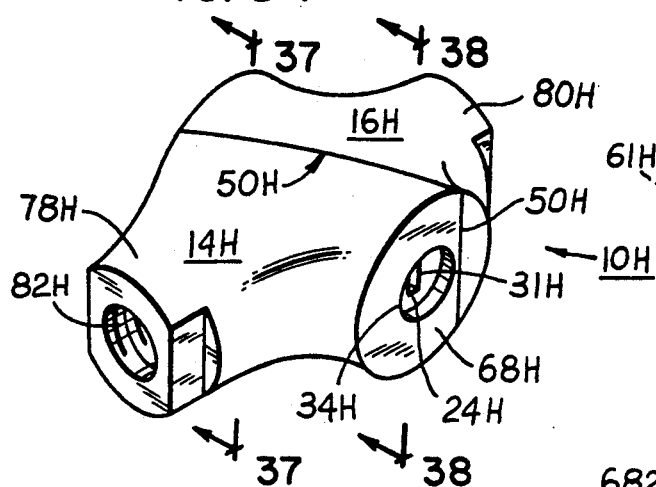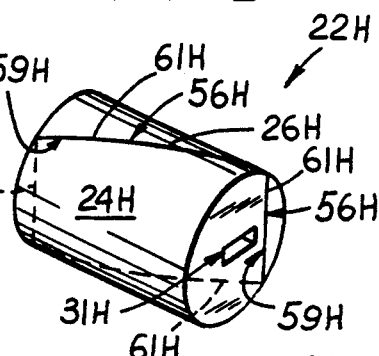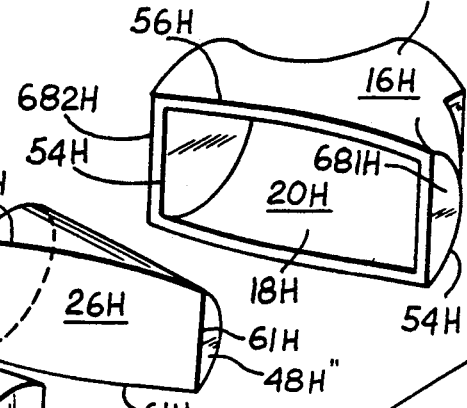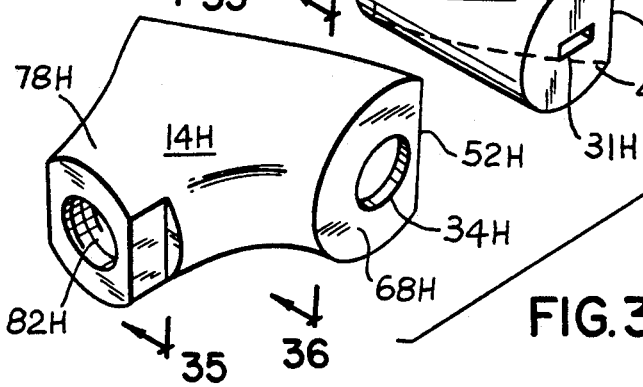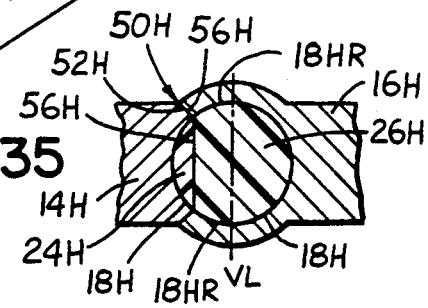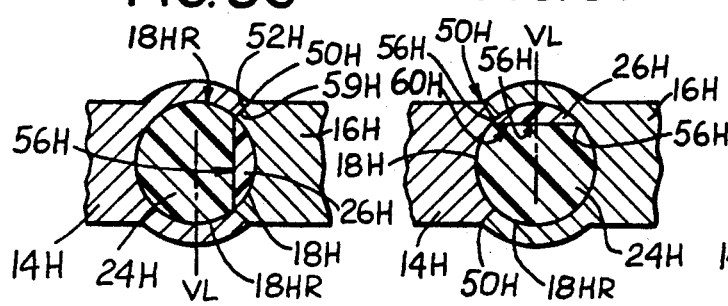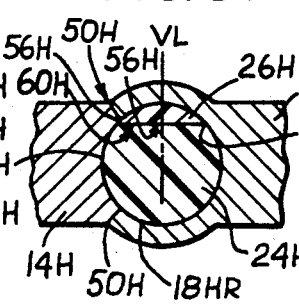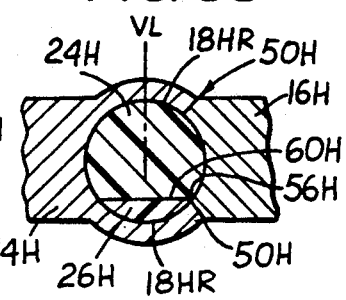

COUPLING DEVICE AND METHODS OF COUPLING

FIELD OF THE INVENTION

This invention relates generally to coupling devices. More particularly, the invention relates to quick disconnect coupling devices for connecting the ends of items such as structural members, electrical conduits, fiber optic cables, fluid flow systems, and the like.

BACKGROUND OF THE INVENTION

Quick disconnect coupling devices are presently employed, or contemplated for employment, in various applications including for connecting structural components in the construction industries, and for connecting various fluid flow systems wherein preventing spillage is important. Some of the presently known fluid connection systems employ valves wherein parts are designed to rotate, translate, compress or decompress from a coupled flow-conducting position to a decoupled flow-preventing or sealing position. However, these prior systems are complicated in construction and performance, expensive to manufacture, and limited in their applications. Improved coupling devices are needed, for example, as mechanical joints for assembly and construction to join, fasten and support trusses and various components. Construction industries require coupling devices which posses structural integrity and which are light in weight, simple in construction (i.e., few parts-static and dynamic), compact, easy to store, and easy to assemble/disassemble and operate. Additionally, advanced technological industries require coupling devices which are robot-compatible and self aligning, and are easy to inspect and/or handle on-site. Further, the devices need to be highly reliable and capable of mating or coupling items along a common axis, maintaining desired load paths, and withstanding heavy induced loads in tension or compression. The joints provided by these coupling devices should also be capable of handling all axial, bending, actuation, torsional and assembly loads encountered during their uses. In certain industries, coupling devices desirably should or should also be adapted to pass or replenish fluids or join electrical connectors, e.g. for energy or data transmission to various facilities and to simultaneously bear structural loads. Desirably, the devices are operable by remote control. Accordingly, there is a definite need in the art for an improved quick disconnect coupling device.

It is therefore an object of this invention to provide the above-mentioned, improved, needed or desired coupling devices.

More particularly, it is an object of this invention to provide an improved quick disconnect coupling device that is simple in construction, economical to manufacture, reliable and efficient in operation, easy to employ, and useful in diverse coupling situations.

Another object of this invention is to provide basic designs for quick disconnect coupling devices which are easily employed or adapted to couple any single or combination of a variety of coupleable or connectable items, subject matter and systems, including but not limited to energy, force, fluid, optical, electrical, physical or other items.

It is another object of this invention to provide coupling devices which are utilizable in a variety of applications and yet can be comprised of a small number of basic, interchangeable parts.

It is another object of this invention to provide the aforementioned coupling devices which are inherently self-aligning, easily maintained, quick and easy to connect and disconnect and couple and decoupled, by hand, while on site and/or in use.

It is another object of this invention to provide aforementioned coupling device which when coupled have great structural integrity and/or load bearing capacity in all axes or directions, regardless of whether the item(s) or systems to be coupled is or are coupled, flowing or connected.

It is still another object of this invention to provide a coupling device which couples and/or connects fluid, optical, electrical or other flow or structural components or systems by a single rotation of the coupler, for example, 90°, from the position the coupler was in when the housing parts and segments were mated.

It is yet another object of this invention to provide the aforementioned coupling device which, by coupler rotation from a coupled flow-connecting position to many other positions, inherently prevents or restricts flow whether the coupling device is coupled or uncoupled.

It is another object of this invention to provide a quick disconnect coupling device that permits selective coupling of the ends of two fluid conduits for unrestricted flow therethrough with little or no pressure drop, and permits sealing and/or flow of the ends of the two fluid conduits when the coupling device is decoupled.

Another object of this invention is to provide any of the aforementioned quick disconnect coupling devices wherein, when the device is decoupled, flow into the housing part cavity is inherently shut off.

A primary object of this invention is to provide a coupling device comprised of a housing having an interior cavity wall and a coupler rotatably retained therein, wherein the coupling device is coupled or not, depending on the position of the coupler within the housing cavity wall.

Another object of this invention is to provide a coupling device wherein the housing parts and coupler segments are adapted such that the housing parts are coupled by the mere disposition of the mated coupler segments in a position or positions different from the position(s) they were in when they and their housing parts were mated.

Another object of this invention is to provide an aforementioned coupling device wherein the housing parts and coupler segments are adapted such that the housing parts are coupled by the disposition of the mated coupler segments in a position or positions wherein a portion of each coupler segment is disposed within and rotatably retained within or by each housing part.

Another object of this invention is to provide a coupling device comprised of a housing having an interior cavity wall and a coupler rotatably retained therein, wherein the coupling device is inherently coupled when a convex surface wall portion of the coupler or each coupler segment is slip-fit engaged or otherwise rotatably retained by or within each housing part.

Another object of this invention is to provide a coupling device wherein the combination of the housing parts' coupler or coupler segment retaining means rotatably-remaining the coupler or segment, preferably by the slip fit engagement of concave portions of the housing part interior cavity wall, with portions of the convex outer surface wall of the coupler or of one or more of its segments, and the relative disposition of the coupler in the housing part or housing cavity, preferably the relative correspondence or non-correspondence of the mating/parting lines or surfaces of the housing parts and of the coupler, inherently respectively decouples or couples the device. Another object of this invention is to provide a coupling device comprised of a housing having an interior cavity wall and a coupler rotatably retained therein, the housing being comprised of housing parts mated along a mating/parting line or surface and the coupler being comprised of segments mated along a mating/parting line or surface, the coupling device being coupled or not depending on the position of the coupler within the cavity and the alignment or relative correspondence of the respective mating/parting lines or surfaces, the coupling device being uncoupled when the coupler is in a first position wherein the mating/parting lines of the respective housing and coupler positionally substantially correspond and being coupled when the coupler is in a second position wherein the mating/parting lines of the housing and coupler do not positionally substantially correspond.

Another object of this invention is to provide a coupling device comprised of a housing having an interior cavity wall and a coupler rotatably retained therein, the housing being comprised of mated first and second housing parts and the coupler being comprised of mated first and second segments, wherein the housing parts are disconnectable when the segments are in a first position wherein each segment is in a housing part and faces the other housing part, and wherein the housing parts are coupled and not decoupleable when the coupler has been rotated to and is disposed in a second or other position wherein a portion of the wall of the first segment is disposed in and retained by a portion of cavity wall of the second housing part and a portion of the wall of the second segment is retained by a portion of the cavity wall of the first housing part.

Another object of this invention is to provide any of the aforementioned or other coupling devices wherein at least one and preferably each housing part has one or more coupler segment-retaining concave interior cavity wall portions, and the coupler segments each have one or more convex outer wall surface portions, wherein the coupler is rotatably retained in said housing concave cavity by its convex outer wall portion(s) being slip fit engaged by the housing part's or parts' one or more coupler segment-retaining concave interior cavity wall portions, the mated housing parts and mated coupling segments each having a similar mating/parting line, the coupling device being mateable when the mating/parting line of the housing positionally substantially corresponds to the mating/parting line of the coupler, and being coupled and not decoupleable when the coupler is so retained in the cavity in a disposition wherein its mating/parting line does not positionally substantially correspond to that of the housing.

Another object of this invention is to provide a coupling device comprised of a housing in turn comprised of mated first and second housing parts which define a concave interior cavity wall, and a coupler comprised of mated segments and rotatably retained in the cavity, the housing parts being uncoupled and partable when each coupler segment is in a first position wherein it is wholly within only one or is rotatably retained by only one housing part and faces another housing part, and the housing parts being coupled when each coupler segment is in a second position wherein at least one coupler segment is disposed in or rotatably retained within or by a portion of each of the housing parts.

It is another object of this invention to provide an aforementioned or other coupling device wherein each coupler segment's mating/parting line has a non-stopping portion and a stopping portion relative to connection and disconnection of the housing parts and of the segments when within the housing, the stopping portion not being operative when said coupler is in first position thereby permitting said housing parts to be disconnected, but being operative when the coupler is in a second position wherein a portion of each segment is disposed within more than one or each housing part and the stopping portion is not normal to the direction of connection and disconnection to thereby prevent connection or disconnection of the housing parts.

Another object of this invention is to provide a coupling section of a coupling device, the section including a housing part having one or more coupler segment-retaining concave cavity wall portions and a coupler segment rotatably retained within the housing part by the coupler segment's one or more convex surface portions being slip fit engaged by one or more of the concave cavity wall portions.

Another object is to provide methods of coupling coupling devices by mere rotation of a coupler housed within the device.

The foregoing and other objects, features and advantages of this invention will be further appreciated from the following description and the accompanying drawings.

SUMMARY OF THE INVENTION

In accordance with the present invention, there is provided a coupling device, which may be referred to as a quick-disconnect coupling device, comprised of a housing having an interior cavity wall which defines a cavity, means for rotatably retaining a coupler therein, a coupler rotatably retained in a close tolerance slip fit or faying engagement within the cavity and means for rotating the coupler within the cavity, the coupler device being coupled or not, depending on the position of the coupler within the cavity. In preferred embodiments of the invention, the shape of a portion of the cavity wall and the corresponding shape of the coupler in slip fit engagement therewith rotatably retain the coupler within the cavity. Although the coupler can be comprised of one integral member or one coupler segment, in preferred embodiments, the coupler is comprised of two or more segments, the housing is comprised of two or more housing parts and each housing part includes a portion of the means for retaining a coupler segment in the housing part. Preferably, at least one, and more preferably each housing part has one or more segment-retaining concave interior cavity wall portion(s) adapted to rotatably retain a coupler segment in the housing part, preferably in a manner that restrains the coupler segment from moving in any linear direction, and each coupler segment has one or more convex outer surface wall portion(s) rotatingly slip fit engaged by the housing part concave cavity wall portion(s). Preferably, the housing parts are mated along a mating/parting line, the coupler segments are mated along a mating/parting line, and preferably the respective mating/parting lines have substantially the same configuration, such that the coupling device is uncoupled when the coupler is in a first position wherein the mating-/parting lines positionally substantially correspond and the device is coupled when the coupler is in a second position wherein the mating/parting lines positionally do not substantially correspond. In a preferred embodiment, a first housing part includes pivot means, in the form of shaft means associated with and extending from the first housing part to and associated with the first segment, for rotatably retaining the first segment within the cavity portion of the first housing part.

In preferred embodiments, each mated coupler segment has a face and the coupling device or housing parts are uncoupled when the mated segments are in a first position wherein each of the respective segments' one or more convex outer surface wall portion(s) is or are rotatably retained by and/or in only one of the respective housing parts and faces the other of the housing parts, and the device or housing parts are coupled when the segments, by rotation, are in a second position wherein one or more of the convex wall portion(s) of each segment is or are in slip fit engagement with one or more of the concave interior cavity wall portion(s) of both housing parts.

Preferably, each housing part has a pair of at least partially opposed extensions, each housing part preferably being C-shaped and preferably having a back wall from which the extensions extend. Each extension of one pair preferably has a concave cavity wall portion, preferably dome-shaped, which at least partially faces and is at least partially opposed to the concave cavity wall portion(s) of the other edge extension of the pair; the extensions of one pair have an outer edge portion which defines a mouth between said extensions and each extension has a coupler segment-retaining concave interior cavity wall portion or portions therein, an outer marginal edge portion of which extends a sufficient distance towards the mouth as to cooperatively rotatably retain a said coupler segment therein when the coupler is in a said first position in said housing; at least one of the coupler segments has two at least partially opposed outer wall surface portions which are rotatingly slip fit engaged by the concave cavity wall portions of the at least partially opposed pair of extensions; a portion of each coupler segment's outer surface wall forms a portion of and the coupler segments together form the coupler's convex outer surface wall which in size and shape juxtaposedly substantially corresponds to the size and shape of the cavity wall; and, each segment is C-shaped and its convex outer surface wall portion(s), preferably dome-shaped, substantially correspond(s) in size and shape to each housing part's concave cavity wall portion(s), so that the housing parts are uncoupled when each segment is in a first position wherein its outer surface wall portion(s) positionally substantially correspond to the cavity wall portion(s) of the respective housing part within which it is located, and the housing parts are coupled when the segments are in a second position wherein the segments' respective outer surface wall portion(s) do not positionally substantially correspond to the respective housing part's cavity wall portions.

This invention includes coupling devices wherein the coupler is adapted such that the housing parts are uncoupled when the coupler is in a first position where its retained convex outer wall portion(s) is or are within, preferably wholly within, only one of the respective housing parts and the housing parts are coupled when the coupler by rotation is in a second position wherein one or more of its convex outer wall portions is or are in slip fit engagement with one or more of the the concave interior cavity wall portions of each of both housing parts. In such an embodiment, the coupler may be a single coupler segment.

Preferably, the concavity of the one or more concave cavity wall portions and/or the convexity of the one or more convex outer wall surface portion(s) include(s) a portion of or an entire surface(s) of revolution(s) of the concave cavity wall and of the convex outer wall surface are continuous and preferably they correspond in size and shape relative to each other. The surface(s) of revolution can be any suitable surface(s), but preferably it is selected from the group consisting of spherical, cylindrical, conical, ellipsoidal, oval, oblong and combinations thereof. Preferably, the cavity wall is spherical and the coupler is spherical. In the most preferred embodiments, the cavity wall is a sphere and the coupler is a sphere.

This invention also includes coupling devices, comprised of a housing having coupler retaining means, an interior cavity wall which has a portion of a concave surface of revolution, and first and second housing parts, each having a cavity wall portion which includes a portion of the concave surface of revolution portion, preferably at least one housing part having one or more concave cavity wall portion(s) adapted to rotatably retain a coupler in the housing, and, a coupler having one or more convex outer surface wall portion(s) which include(s) a portion of a convex surface of revolution adapted to rotatingly slip fit engage a portion of said cavity wall surface of revolution portion of each housing part. The housing parts are uncoupled and partable when the coupler is in a first position wherein it allows mating and parting of the respective housing parts, and they are coupled and not partable when the coupler is in a second position wherein one or more of its convex wall portion(s) is or are slip fit engaged by one or more of said coupler retaining concave cavity wall portion(s) of both housing parts, to thereby prevent parting of and thereby couple the housing parts.

This invention also includes methods of coupling a coupling device, which include providing a housing comprised of two or more mated housing parts each having a cavity wall portion which includes a concave portion of a surface of revolution and is adapted to house a coupler therein, and which portions define a housing cavity, rotatably retaining a coupler within the cavity, the coupler having an outer wall which includes a convex portion of a surface of revolution, and coupling the device by rotating the coupler from a first position wherein the coupler does not interfere with parting or decoupling of the housing parts, to a second position wherein the coupler prevents parting of and thereby couples the housing parts.

The methods also include providing a coupler comprised of two or more mated coupler segments, each having an outer surface wall which includes a portion of a convex surface of revolution, said cavity wall and coupler portions of surfaces of revolution being adapted to slip-fit engage each other, and providing means for rotating, and means for rotatably retaining the coupler within the cavity.

Methods are also provided which include providing the housing parts with mating/parting lines, and the segments with mating/parting lines wherein the mating-/parting lines of the housing parts and coupler preferably have substantially the same configuration, and coupling the device by moving, preferably rotating, the coupler from a first position wherein the respective mating/parting lines positionally substantially correspond, to a second position wherein they do not.

When the one or more concave cavity wall portions and the convex outer wall surface(s) are spherical, the preferred mating/parting lines preferably each comprise a continuous line formed by two pairs of 180° circular arcs generated by a 45° radial extending from the center of said coupler, the two arcs of said one pair being parallel to each other and facing in the same direction, and the two arcs of the other pair being parallel to each other and facing in the opposite direction to and being in different planes than said arcs of the other pair.

In preferred embodiments of the invention, each housing part includes means for connecting an item thereto such that when an item is connected to each housing part, the items are not coupled to or connected or in communication with each other when the housing parts are mated and the coupler is in a said first position, but they are so coupled, connected to and/or in communication when said coupler is in a said second position. Preferably, the item is selected from the group consisting of a structural item, and an item adapted to flow or transport fluid or energy therethrough or therealong, and the coupler is adapted to optionally and/or selectively couple said structural items and/or flow or transport. When the item is designed or adapted to flow or transport fluid or energy or the like therethrough or therealong, the coupler is preferably adapted to block, prevent or interrupt flow or transport when it is in a first position, and to optionally and/or selectively couple or join partially or completely without restriction flow or transport between the items when the coupler is in a second position, and/or block or prevent or interrupt the same when the coupler is in another second position, sometimes herein referred to as a third position.

Although the device can be adapted such that the coupler is rotatably retained within the cavity wall in a manner which allows it to rotate about multiple axes, preferably the coupler rotates about a single, preferably fixed, axis which desirably is common to a segment and housing part, preferably its extensions.

The means for rotating the coupler within the cavity wall can include drive means, pivot means, shaft means, control means and response means for effecting rotation of the coupler, or one or more segments. The coupler can be rotated manually or automatically, internally, externally or remotely.

This invention includes as a component of the coupling device, a coupling section comprised of a housing part whose one or more coupler segment-retaining concave cavity wall portion(s) is or are adapted to rotatably retain a coupler segment in the housing part in a first position where it is retained and restrained from moving substantially in any linear direction yet is rotatable about at least one axis, and a coupler segment whose one or more convex outer wall surface portions are so retained in the cavity in a said first position by one or more of the convex outer wall surface portion(s) being slip fit engaged by the concave cavity wall portion(s).

In one of the preferred embodiments adapted for coupling fluid flow or transport, each housing part has a channel which communicates with the cavity, the coupler has a bore extending therethrough which is selectively communicable with each housing part channel, and the coupler is adapted to partially or completely block the housing part channel(s) or interrupt flow or transport when the coupler is in a said first position, and adapted to optionally block or render the housing part channels in full or partial communication when the coupler is in a second position.

With respect to couplers adapted to flow or transport fluid or energy therethrough or therealong, the couplers preferably are also adapted such that, when the housing parts are coupled and the coupler can be in a second position, which may be referred to as a third position within the cavity, there is no communication of or coupled flow or transport of fluid or energy through or via the coupler. The coupling device can also be adapted such that in a coupler second position, there can be partial communication between or effecting or coupling of flow or transport by means of or via the coupler.

In other preferred embodiments of the coupling device of this invention, the coupling devices are adapted for a plurality of applications, such that, for example, coupling devices adapted for fluid flow are also adapted to couple structural items and/or have load bearing capacity.

BRIEF DESCRIPTION OF THE DRAWINGS

FIG. 1 is a perspective view of a preferred embodiment of the coupling device of this invention, mated but uncoupled.

FIG. 2 is a perspective view of the coupling device of FIG. 1 showing the coupler in perspective within a housing shown in vertical section taken along line 2—2 of FIG. 1.

FIG. 3 is a vertical section as would be taken along line 3—3 of FIG. 2.

FIG. 4 is an exploded, perspective view of components of the coupling device of FIG. 1

FIG. 4A is a perspective view of the coupler as it sits in the coupling device of FIG. 1.

FIG. 5 is an exploded, perspective view of the coupler segments of FIG. 4 initially moved into their respective housing parts.

FIG. 6 is a perspective view of the housing sections formed when the coupler segments of FIG. 5 are rotated and seated in their housing parts.

FIG. 6A is a perspective view (with portions omitted) of the coupler of FIG. 4A, schematically showing the mating/parting lines of the housing parts overlaid on the coupler mating/parting lines.

FIGS. 7 and 8 are side views with portions in phantom, FIG. 7 showing the mated, uncoupled device of FIG. 1, and FIG. 8 showing the device of FIGS. 1 and 7 coupled.

FIGS. 9, 10 and 11 are views partly in perspective and partly in vertical section through the coupling device of FIG. 1, FIG. 9 showing the device uncoupled, and FIGS. 10 and 11 showing the coupler rotated and the device coupled.

FIGS. 9A-11A are top views of the coupling devices respectively shown in FIGS. 9, 10 and 11, but with portions of the housing parts shown in section and portions of them broken away.

FIGS. 12-14 are vertical sections as would be taken along lines 12—12, 13—13 and 14—14 of FIGS. 9, 10 and 11 respectively. FIG. 12A is an enlarged, isolated view of that which is encircled by dashed lines in FIG. 12.

FIG. 15 is a vertical section similar to FIG. 14, but showing the coupler rotated clockwise another 90°.

FIG. 16 is an exploded, perspective view of components of an alternative embodiment of the coupling device of this invention.

FIG. 17 is a top view of a horizontal section as would be taken through the components of FIG. 16 after they are assembled.

FIG. 18A is an exploded, perspective view of an alternative embodiment of the coupler of this invention.

FIG. 18B is an exploded, perspective view of another alternative embodiment of the coupler of this invention.

FIG. 18C is a side view of the second coupler segment of FIG. 18B.

FIG. 19 is a perspective view of an alternative embodiment of the coupling device of this invention.

FIG. 20 is a perspective view of the device of FIG. 19 separated into its respective housing sections.

FIG. 21 is an exploded, perspective view of the components of the device of FIG. 19.

FIG. 21A is a perspective view with portions broken away of the coupler formed by the mated coupler segments of FIG. 21.

FIG. 22 is a vertical section with portions broken away as would be taken along line 22—22 of FIG. 19.

FIG. 23 is a vertical section with portions broken away similar to FIG. 22 but showing the coupler of FIG. 22 rotated and the device coupled.

FIGS. 27 is a perspective view of another embodiment of the coupling device of this invention.

FIG. 28 is a perspective view of the device of FIG. 27 separated into its housing sections.

FIG. 29 is an exploded perspective view of components of the coupling device shown in FIG. 27.

FIG. 30 is a perspective view of the coupler employed in the coupling device of FIG. 27, rotated 90° from the position shown therein.

FIG. 31 is vertical section with portions broken away, as would be taken along line 31—31 of FIG. 27.

FIG. 32 is a vertical section similar to FIG. 31, showing the coupler rotated and the device thereby coupled.

FIG. 34 is a perspective view of another embodiment of the coupling device of this invention.

FIG. 34A is an exploded perspective view of components of the coupling device of FIG. 34.

FIG. 34B is a perspective view of the coupler of FIG. 34 rotated 90° from the position shown therein.

FIGS. 35 and 36 are vertical sections, with portions broken away, as would be taken along lines 35—35 and 36—36 of FIG. 34A if the components were mated.

FIGS. 37 and 38 are vertical sections with portions broken away, respectively taken along lines 37—37, 38—38 of FIG. 34.

DETAILED DESCRIPTION OF THE INVENTION

Figures 24, 25:
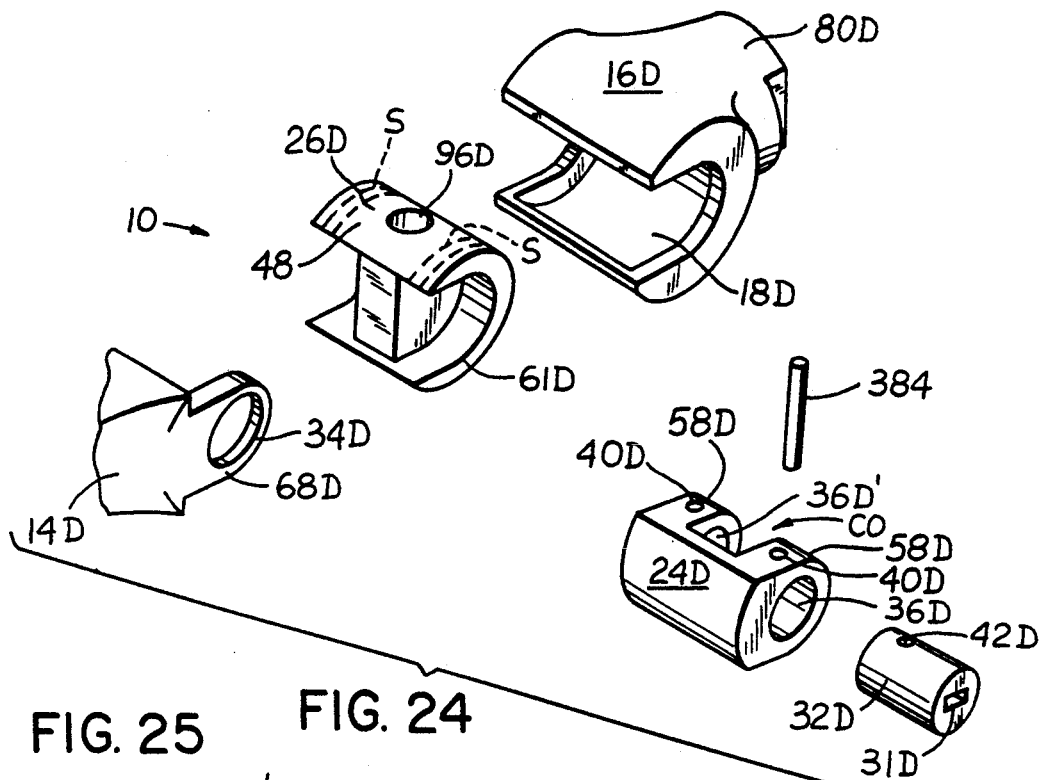
FIG. 24 is an exploded view with portions broken away showing components of another embodiment of the coupling device of this invention.
FIG. 25 is a perspective view of an alternative second coupler segment of this invention.

Referring now to the drawings in detail, FIGS. 1-3 show a preferred embodiment of the quick disconnect coupling device of this invention. More particularly, there is shown a coupling device, generally designated 10, comprised of a housing 12, in turn comprised of housing parts, here shown and generally referred to as first and second housing parts 14 and 16. Housing 12 has an interior cavity wall 18 which defines a preferably spherical cavity 20 adapted to rotatably house or retain a coupler 22 therein. The coupling device includes a coupler generally designated 22, rotatably housed or retained in slip fit engagement within cavity 20, or in faying or slip fit association with cavity wall 18, the coupler being preferably a sphere or spherical and comprised of one or more segments, here shown as and generally referred to as first and second segments 24, 26. For fluid and other appropriate applications, coupler 22 has a bore 96 therethrough. Coupling device 10 preferably includes suitable means, generally designated 28, for rotating the coupler within the cavity, the means here including a handle 29 connected by suitable means, for example, pin 30, to shaft means, here shaft 32, associated with and extending from the first housing part to the first segment. The inner end portion of shaft 32 passes through shaft bore 34 of first housing part 14 and into shaft bore 36 in first coupler segment 24, and is fixedly connected to first segment 24 by suitable means such as pin 38 seated in hole 40 in the first segment's mating-/parting surface generally designated 58 and in hole 42 of shaft 32 (See FIG. 4).

Coupling device 10 also includes suitable means, generally designated 44, for rotatably retaining coupler 22 or a segment or segments within cavity 20. Each housing part 14, 16 includes a portion of the coupler or segment retaining means for rotatably retaining a coupler segment within the housing part. Although the coupler retaining means can merely or mainly comprise the shape of a portion or portions of cavity wall 18 and the shape of coupler 22 or of a coupler segment 24 or 26 in slip fit engagement therewith, in the preferred embodiments, at least one, and, as shown, for example, in FIGS. 1-4, preferably each housing part 14, 16 has one or more coupler or segment-retaining concave interior cavity wall portion(s) 44 adapted to rotatably retain and/or restrain a coupler segment in the housing part. Preferably, the means for retaining the coupler is capable of restraining and restrains the segment from moving in any linear direction, especially when the segment or coupler is fully seated in a housing part. In preferred embodiments, even when the means for rotating includes a shaft such as 32 which is associated with the first housing part and first segment and also functions as means for retaining the first segment, the second housing part has coupler-retaining means, desirably one or more segment-retaining concave interior cavity wall portion(s). The coupler retaining means desirably includes elements of coupler rotating means 28 which cooperate with the coupler retaining means to rotatably retain first coupler segment 24 in first housing part 14, and also rotatably retain coupler segments 24, 26 within cavity 20 when the housing parts and segments are seated therewithin and mated and the coupler 22 is rotated a sufficient degree from the position shown in FIG. 2 to a or any position where a portion of each segment is in both housing parts, such that the housing parts are thereby coupled. In preferred embodiments, elements of the coupler retaining means include pivot means (here including handle 29, shaft 32 and pin 38) for pivoting a segment, 24 about an axis of rotation, here a fixed axis within first housing part 14.

Housing parts 14, 16 are mated along a housing mating/parting line, generally designated 50, which broadly refers to the surfaces, edges, or line(s) of the housing parts which meet or mate, or are proximate, adjacent or juxtaposed to each other when the housing parts meet or mate. Housing mating/parting line 50 includes and is sometimes hereinafter referred to as composite mating/parting line "CM/P line", meaning the joint or the line(s) which appear(s) on the outer surface of the housing 12, at and or along the points, places or edges where the mating surfaces, edges, points or lines of the housing parts meet, where, for example, the outer edge 52A of first housing part mating/parting surface generally designated 52, and the outer edge 54A of second housing part mating/parting surface, generally designated 54, meet when the housing parts are mated. Mating/parting line 50 generally represents, comprises, and herein throughout is understood to include respective first and second housing part mating/parting surfaces or lines 52, 54, including their respective surfaces 52, 54, and their respective inner and outer edges 51 and 52A and 53 and 54A. Coupler segments 24, 26 are likewise mated along a coupler mating/parting line, generally designated 56, which broadly refers to the surfaces, edges or line(s) of the coupler segments which meet or mate or are proximate, adjacent or juxtaposed to each other when the coupler segments meet or mate. Coupler mating/parting line 56 includes and is sometimes hereinafter referred to as composite mating/parting line "CM/P line", meaning the joint or line(s) which appear(s) on the outer surface of coupler 22, at and along the points, places or edges where the mating surfaces, edges, points or lines, of the coupler segments meet, where, for example, the outer edge 59 of first segment mating/parting surface or line 58 and the outer edge 61 of second segment mating/parting surface or line 60 of second segment 26 meet when the coupler segments are mated. Composite mating/parting line 56 generally represents, comprises, and herein and throughout is understood to include first and second coupler segment mating/parting surfaces or lines 58, 60, including their respective outer edges 59 and 61 and the outer edge, line or surface (see, e.g., 59I in FIGS. 39 and 40) of an integral, one-piece coupler or single segment coupler. As will be more fully explained, the mating/parting surfaces or lines of the housing and the coupler, often particularly the housing's parts' inner edges 51 and 53 and the coupler segments' outer edges 59 and 61, preferably have substantially the same configuration such that the coupling device is coupled or not depending on the position of the coupler in the cavity, more particularly, depending on whether the respective housing and coupler mating/parting surfaces or lines positionally substantially correspond, as that phrase is later explained to be broadly understood to mean in accordance with this invention. In FIGS. 1–3, the coupling device is mated, but is uncoupled, i.e., not locked together, when and because coupler 22 is in a first position (for example, as shown in FIGS. 1–4, and 6–7) wherein the respective housing and coupler M/P lines or surfaces positionally substantially correspond. As shown in these Figures, the mated housing parts with their respective coupler segments respectively seated, mounted or housed therein, that is first housing section 62 comprised of first segment 24 rotatably retained preferably from moving in any linear direction, in first housing part 14, and second housing section 64 comprised of second segment 26 likewise rotatably retained in second housing part 16 (see FIG. 6), can be separated from one another by moving the housing parts or sections away from each other along the horizontal axial center line, CL, which runs through the coupling device (see FIG. 1.). As will be explained, the mated coupling device of FIGS. 1–3 can be coupled or locked together by moving or rotating shaft 28 a sufficient extend, say 90° as shown, such that coupler 22 is in a second position wherein the composite mating/parting lines 50 of housing 14 and 56 of coupler 22 positionally do not substantially correspond (See FIG. 8).

As best shown in FIGS. 3–6, each housing part preferably is C-shaped and has extending from its back wall 66 a pair of at least partially opposed extensions 68. Each extension of one pair preferably has a coupler segment-retaining concave interior cavity wall portion 44 therein which at least partially faces and is at least partially opposed to the concave cavity wall portion(s) of the other extension of its pair. As shown, the extensions 68 of a pair have an outer edge portion 70 which defines a mouth 72 between the extensions, and which has an arcuate (when viewed in section) outer marginal edge portion 74 which extends a sufficient distance towards the mouth as to cooperatively rotatably retain a coupler segment within or in the extensions of the housing part when the coupler is in a first position in housing 12, and to rotatably retain the coupler in the cavity when the coupler is in a second position. When the means for rotating the coupler are associated with one housing part and its segment, say first housing part 14 and first segment 24, preferably at least each extension of the second housing part includes a coupler segment retaining concave interior cavity wall portion. As shown, the extensions are adapted such that when housing parts 14, 16 are mated, each extension of one pair extends into and is mated within the mouths between the extensions of the pair of the other housing part.

Referring now to coupler 22, the coupler, preferably each coupler segment, here 24, 26, has one or more convex outer surface wall portion(s), generally designated 48, rotatingly slip fit engaged and retained by the segment-retaining concave interior cavity wall portion(s) of the or each housing part. Each segment has two at least partially opposed convex outer surface wall portions 48 rotatingly slip fit engaged by the concave cavity wall portions of the housing parts, e.g. their extensions 68. The coupler's convex outer surface wall or wall portions in size and shape preferably juxtaposingly substantially correspond(s) to the size and shape of the housing cavity wall, and each segment's outer surface wall portion(s) substantially correspond(s) in size and shape to its, preferably each, housing part's cavity wall portion, such that when housing parts 14, 16 are uncoupled, with respect to each housing section 62, 64, each segment's outer surface wall portion(s) positionally substantially correspond(s) to and is rotatably retained by the cavity wall portion(s) of the respective housing part within which it is located, and, as shown in FIGS. 8, 10-11A, and 13-15 when the housing parts are coupled, each segment's outer surface wall portion(s) do not positionally substantially correspond to the respective housing part's cavity wall portions. Preferably, one or more convex wall portions 48 of each of the first and second segments 24, 26, and preferably also one or more concave cavity portions of each of the housing part(s) includes a portion of a surface of revolution. Preferably, portions of the housing part and segment(s) substantially correspond. Although the surface of revolution can be any which is suitable, preferably it is one which is selected from the group consisting of spherical, cylindrical, conical, ellipsoidal, oval, oblong and combinations thereof.

FIG. 4 is an exploded view showing main components of coupling device 10. More particularly, FIG. 4 shows first and second housing parts 14 16, and, between them, first and second coupler segments 24, 26. First and second coupler segments 24, 26 are shown in the positions they would be in as they would sit in their respective first and second housing parts 14, 16 when the segments and housing parts are in position to be brought together and mated as shown clearly in FIG. 6. FIG. 4A shows coupler segments 24, 26 of FIG. 4 mated, and the coupler as a sphere as it would appear inside housing 12 of FIGS. 1 and 2. In the positions in which coupler segments 24, 26 are shown in FIG. 4, without being rotated, they cannot be moved in a line opposite from each other directly into respective housing parts 14, 16.

To move the coupler segments into the housing parts and assemble the coupling device of this invention, each segment is rotated 90° from the position shown in FIG. 4 and moved into its respective housing part (see FIG. 5). Once so entered into their respective housing parts and the positions shown in FIG. 5, coupler segments 24, 26 are rotated 90° in either direction about center line CL so that the segments are fully seated and rotatably retained in their respective housing parts in the facing ready-to-be mated positions shown in FIG. 6. Once so seated and rotatably retained within their respective housing parts in the positions shown in FIG. 6, the housing parts, i.e., housing sections 62, 64 are brought together along center line CL and mated, as shown in FIGS. 1-3 and 7. It is to be noted that given the arcuate 90° degrees out of phase angular contour of first housing part M/P line 52 and second housing part M/P line 54, the housing parts are advantageously inherently self-aligning. Also, it is to be noted that second segment 26 is inherently retained within second housing part 16 by the concave cavity wall portion 18R. Once the housing parts or sections are mated, the coupling device is, or housing parts are coupled by rotation of coupler 24 here by means of shaft 29, to any position where the coupler's composite mating/parting line 56 positionally does not substantially correspond to that of first housing part's composite mating/parting line 50. It is to be noted that in FIG. 6 the orifices 86, 88 of channels 82, 84 of first and second housing parts 14, 16 are blocked by the respective convex outer wall portions of respective coupler segments 24, 26, each coupler segment is rotatably retained within its respective housing part so that neither segment can or will move in any linear (i.e., non-rotary) direction, and the opposite ends or orifices of through-bore 96 are sealed against the concave cavity wall portions of second housing part 16. Thus, when the device is uncoupled, in fluid applications, flow from the channels into the cavity or cavity portion is inherently shut off.

The role of the relative positions of the coupling device's respective composite mating/parting lines 50, 56 will now be explained. In these Figures, the mating/parting lines have substantially the same configuration. This is shown in FIGS. 2, 4, 6, 6A and 7 wherein, it can be seen, especially in FIGS. 6 and 6A that the configuration of the inner edge 51 of mating/parting line or surface 52 of first housing part 14 (only mating/parting lines, surfaces and edges thereof shown in FIG. 6A) substantially corresponds to the configuration of the outer edge 59 of mating/parting line or surface 58 of first coupler segment 24. Likewise, the configuration of inner edge 53 of mating/parting line or surface 54 of second housing part 16 substantially corresponds to that of the outer edge 61 of mating/parting line or surface 60 of second coupler segment 26. Having the mating/parting lines of the respective segments and respective housing parts in substantial correspondence allows the housing sections 62, 64 to be brought together, mated and parted as shown in FIG. 1, or withdrawn and parted, as shown in FIG. 6.

In FIG. 6A, for simplicity, and for explanation of the positional substantial correspondence of the mating/parting lines, the mating/parting lines or surfaces 52, 54 of housing parts 14, 16 are shown as one, and likewise the inner edges 51, 53 of respective lines or surfaces 52, 54 of housing parts 14, 16 and coupler composite mating/parting line 56 and the coupler segments' outer edges 59 and 61 are shown as one line. While FIG. 6A omits through-bore 96 and shaft bore 36 for simplicity, it exemplifies that such a spherical coupler can be employed in coupling devices of this invention, especially for structural applications, i.e., connecting or joining structural items.

FIGS. 7 and 8 are side views of the coupling device of this invention, FIG. 7 showing the mated, uncoupled coupling device of FIG. 1, and FIG. 8 showing the device of FIGS. 1 and 7 coupled. More particularly, FIG. 7 shows housing parts 14, 16 mated, and, with dashed lines, shows coupler 22 slip fit engaged in housing cavity wall 18 and the device uncoupled mainly because housing CM/P line 50, herein and elsewhere understood to include inner edges 51, 53 of respective first and second housing part mating/parting lines or surfaces 52, 54, positionally substantially correspond(s) with coupler CM/P line 56, herein and elsewhere understood to include outer edges 59, 61 (not shown in FIG. 7) of coupler segments 24, 26.

FIG. 8 shows coupling device 10 of FIG. 7 coupled, due to or by rotation of handle 29 (phantom lines) and coupler 22 (dashed lines), here, clockwise 90°. The device is coupled mainly because, with coupler 22 in this position, coupler CM/P line 56 is now 90° out of phase with and does not positionally substantially correspond to housing CM/P line 50. Rotating coupler 22 further clockwise or counter clockwise would also couple the device, so long as the coupler is not rotated to a position where the housing part and coupler M/P lines positionally substantially correspond.

FIGS. 9 through 11A will now be described, in connection with a coupling concept of this invention. More particularly, FIGS. 9 and 9A show coupling device 10 mated but uncoupled since coupler 22 is in a first position wherein housing CM/P line 50 positionally substantially corresponds to the position of coupler CM/P line 56. In FIG. 9, as in FIG. 6, each segment 24, 26 is in a first position wherein its respective convex outer surface wall portion(s) positionally substantially correspond(s) to portions of cavity wall 18 of the housing part within which the segment is located. This is clearly shown in FIG. 6. It is to be noted here that in accordance with this invention, the coupler "being in the or a first position" includes embodiments (not specifically shown herein) wherein the device is mated but uncoupled in situations when first segment 24 is or is rotated to be wholly within, and its convex outer wall surface portion(s) substantially correspond with, the concave cavity wall portion(s) of second housing part 16, and conversely simultaneously, as when second segment 26 is or is rotated to be wholly within, and its convex outer surface wall portion(s) substantially correspond with, the concave cavity wall portion(s) of first housing part 14, for example, as when coupler 22 has no fixed axis and, for example, its rotation is remotely controlled to cause first and second segments to entirely switch housing parts.

FIGS. 10 and 10A show coupling device 10 mated and coupled, since coupler 22 has been rotated by handle 29 from the first position of FIGS. 9, 9A (represented by the phantom line in FIG. 10), to some degree, here less than 45°, to a second position wherein coupler CM/P line 56 does not positionally substantially correspond to the position of housing CM/P line 50. Being coupled, the housing parts cannot now be separated without rotation of the coupler to a first position. In FIGS. 10 and 10A, flow through channels 82, 84 is inherently blocked by the outer surface wall of coupler 22 blocking orifices 86, 88.

FIGS. 11 and 11A show coupler 22 rotated 90° from a first position in FIGS. 9, 9A, and rotated to some degree, here shown as more than 45° from the second position shown in FIGS. 10, 10A. Coupling device 10 is still coupled since the coupler or coupler segments are in another second position where coupler CM/P line 56 does not positionally substantially correspond to the position of housing CM/P line 50. In FIGS. 11 and 11A, the coupler is in a second position wherein bore 96 is fully aligned or in registration with orifices 86, 88 and with channels 82, 84. This will be more fully explained in connection with FIG. 14.

An explanation of why the coupling device is coupled in FIGS. 10-11A is that the convex outer surface wall portion(s) of coupler segments 24, 26 do not positionally substantially correspond to the cavity wall portion(s) of the respective housing parts in which they are respectively located. Another coupling concept embodied in the coupling device of this invention is demonstrated in reference to FIGS. 6 and 9-11A, in that each segment, here, first and second segments 24, 26 can have a face 74, 76 (FIG. 6), and coupling device 10 or housing parts 14, 16 are uncoupled, as in FIGS. 9, 9A, when the coupler or its segments are in a first position, wherein each of the respective segments' one or more convex outer surface wall portions 48 is or are rotatably retained by or in only one housing part and preferably each segment faces the other housing part, and the device or housing parts are coupled, as in FIGS. 6, 9 and 9A, when the segments, by rotation, are in a second position wherein one or more convex outer surface wall portion(s) 48 of each segment is or are in slip fit engagement with and retained by one or more of the coupler-retaining concave interior cavity wall position(s) of each of the first and second housing parts. As clearly seen, in FIGS. 6 and 9 each coupler segment 24, 26 is wholly within and rotatably retained by only one housing part 14, 16 and faces the other housing part, and in FIGS. 10 through 11A, a portion of each segment is in and cooperatively rotatable retained by both housing parts.

FIGS. 12-14 are vertical sections as would be taken along lines 12—12, 13—13, and 14—14 of FIGS. 9, 10, and 11 respectively. FIG. 15 is a similar vertical section. Although these Figures will be used to describe a fluid application of the coupling device of the invention, as will be explained, they will also serve to exemplify a wide variety of the applications and the ease of operability of the device of this invention. FIG. 12 shows coupling device 10 uncoupled, in that coupler 22 is in a first position. FIGS. 13-15 show various exemplary second positions of coupler 22 in coupled coupling device 10. In none of these second positions do the mating/parting lines or surfaces of the coupler and housing parts positionally substantially correspond. The same is true as for the concave cavity wall portions of the housing parts and the convex outer surface wall portions of the coupler segments.

FIG. 12 shows that each housing part 14, 16 of coupling device 10 has suitable means, here shown as members, generally designated 78, 80, for connecting, joining or feeding to the device and rendering in communication through the device, any two items or systems. The terms "items" or "systems" are herein to be taken in their broadest workable meanings and are herein to be understood to include any coupleable, or connectable, moveable, communicable, flowable or transportable matter, including but not limited to energy, force, fluid (e.g. gas, liquid, particulate) electrical, optical, magnetic, physical (e.g., structural) or other item or system or combination thereof. It is understood that bore 96 may be empty in certain applications or may include, for example, filters, valves, etc. for fluid applications and may contain, for example, wires, cables, optical fibers, etc., for partial or full communication with like wires, cables, optical fibers, etc. in channels 82, 84.

For fluid flow or transport applications, members 78, 80 preferably are fixed, integral, tubular conduits, each having a respective channel 82, 84 running therethrough which communicates with housing cavity 20 through an orifice 86, 88 in housing cavity wall 18. Members 78, 80 in turn have suitable means for being fixedly or movably connected to the item or systems or means for carrying, transporting, etc. the matter to be coupled by the coupling device. Here, members 78, 80 are threaded at 90 for threaded engagement of hoses, pipes or the like (not shown). This invention preferably includes suitable means for sealing various surfaces such as the faying surfaces of coupler 22 and cavity wall 18 from fluid leakage. Suitable means are here shown as including one or more O-rings 92 made of suitable material, such as elastomers, plastics, combinations thereof, etc. seated in seats 94 in cavity wall 18 preferably adjacent and about the lips of orifices 86, 86. O-rings (not shown) may be seated in seats about bore 96. In FIG. 12A, a gasket or seal 98 can be provided in a seat 100 provided in either or both mating/parting lines and/or surfaces 50, 56, and a seal can be seated in groove "G" in and about respective shafts 32, 32I to effect a seal between bores 34, 34I and the shaft(s).

In FIG. 12, mated coupler 22 is in a first position wherein coupler and housing composite mating/parting lines or surfaces 50 and 56 substantially correspond, the device is uncoupled, coupler bore 96 is 90° vertical to centerline CL and channels 82, 84, the mouths of through-bore 96 are slip-fit engaged with and, preferably, though not shown, sealed against cavity wall 18, and fluid flow or communication between channels 82, 84 is blocked or prevented by the outer wall of coupler 22 sealing channel orifices 86, 88.

FIG. 12A is an enlarged, isolated view of the mating-/parting line portion encircled by the dashed lines in FIG. 12. FIG. 12A shows that a suitable seal 98 can be employed if desired in a seat in one or both of the housing part mating/parting surface(s) to seal these surfaces.

FIG. 13 shows mated coupler 22 in a second position wherein housing and coupler CM/P lines 50, 56 do not positionally substantially correspond, the device is coupled and coupler 22 is shown further rotated clockwise to a position wherein flow or communication between channels 82, 84 is still prevented.

FIG. 14 shows mated coupler 22 rotated to another second position wherein, with the device coupled, channels 82, 84 are fully coupled or in communication, and fluid or whatever flows between channels 82, 84 through through-bore 96. It is to be noted that for fluid applications there is little or no resistance to flow or pressure drop in the flow through the device shown in FIG. 14. Although not shown, it is also to be noted that, if desired, flow through through-bore 96 or between the channels can be throttled modulated or partial depending on whether bore 96 is fully or only partially blocked or aligned with orifices 86, 88 of channels 82, 84.

FIG. 15 shows mated coupler 22 rotated clockwise 90° from its position in FIG. 14. More particularly, FIG. 15 shows coupler 22 in another second position, wherein, through-bore 96 is again vertical to center line CL and to the channels and fluid flow or communication between them is blocked, as in FIG. 12. In FIG. 15 however, in contrast to FIG. 12, the housing and coupler composite M/P lines 50, 56 do not substantially correspond and the device is coupled. The position of coupler 22 in FIG. 15 is 80° opposite to what it was in FIG. 12. FIGS. 13-15 exemplify the embodiments wherein the device is coupled for one reason because a portion of each coupler segment 22, 24 is located in each respective housing part 14, 16, or a portion of each segment's convex surface wall is slip fit engaged by and rotatably retained by a concave cavity wall portion such as 18R of each housing part. This prevents the housing parts from parting. It is understood that members 78, 80 can be adapted, for example, internally or externally threaded, to receive likewise adapted, threaded portions of structural members such as arms, trusses or poles, or of particulate carrying tubular members, or they can otherwise be adapted to carry or transport electrical cables, wiring, optical fibers or cables, energy or other items or matter for coupling, flowing or transporting the same through the device. It is to be further understood that the coupling device of this invention encompasses embodiments, for example, ones suitable for structural applications, wherein neither the coupler nor any coupler segment has a through-bore. For such structural applications, members 78, 80 can be solid and suitably adapted to be connected to structural items to be coupled.

FIGS. 12-15 show that the concave cavity wall portions of the opposed extensions of the second housing part 16 are dome-shaped, and that coupler retaining concave cavity wall portions 18R are opposed to each other on opposed extensions. Although they are not shown, the same applies to the concave cavity wall portions of the first housing part extensions.

FIGS. 12 through 15 also show that portions 18R of concave cavity wall 18 of second housing part 16, which in these Figures extend to the left beyond the vertical axis line VL drawn through the device, as also exemplified in FIGS. 22-23, serve as coupler or coupler-segment retaining means for rotatably retaining a coupler or segment within the housing or housing part of the device of this invention. (See also FIGS. 3-5 and 9-11). Though not shown, the same or corresponding portions of the cavity wall extend to the right of line VL for the opposed extensions of first housing part 14, and these portions also function as coupler-or/coupler-segment retaining means. (See FIGS. 9A-11A).

FIG. 16 is an exploded perspective view of components of an alternative embodiment of a portion of a coupling device of this invention. FIG. 17 is a top view of a horizontal section as would be taken through the components of FIG. 16, after they are assembled into a housing section 16', coupler segment 22' being rotatably mounted by shafts 33, 32' within first housing part 14'. FIG. 16 shows that first housing part extensions 68' have similar opposed interior cavity wall portions 18", (one shown in FIG. 16) which are flat or planar rather than convex surfaces, though the interior cavity wall portion adjacent the back wall of C-shaped housing part 14, is concave as in the previous Figures (See FIG. 4). Each housing part extension 68'has a bore therethrough, the shaft bore designated 36' being to accommodate shaft portion 32', which can be an integral extension of or separate from shaft 32 of the previous Figures, or integral with or separate from modified shaft 33, which has a squared head to accommodate being engaged and rotatably driven by a socket wrench (not shown) for rotating coupler 22'. In this embodiment, as aligned, coupler 22' can be moved directly into housing part 14' and, once therein, coupler 22' can be connected to housing part 14' and made rotatable therewithin about a fixed axis when shafts 33, 32' are seated in housing bores 34, 34' and in coupler segment bores 36, 36', and pins 38, 38' are dropped into holes 40, 40' on coupler 22' and into holes 42, 42' in shafts 33, 32'. Coupler 22' shown in FIG. 16 is similar to coupler first segment 24, except that coupler 22' has opposed outer wall surfaces 48' which are planar or flat, rather than convex or spherical for slip fit or faying engagement with corresponding flat surfaces 18" of extensions 68', and except that it has an additional bore 36' for receiving shaft portion 32'. The embodiment shown in FIGS. 16, 17 is well adapted for fluid or structural applications, and shows that a coupler segment need only have one convex outer surface wall portion, here shown as 48A. Of course, coupler segment 22' could have only one flat outer wall surface portion as at 48', with the rest of the outer surface, for example, being convex or spherical. It is to be noted that the housing section shown in FIGS. 16 and 17 can effectively be employed with another coupler, for example, with second coupler segment 26 of FIG. 4, or it can be used effectively by itself as a coupler, for example, when the other housing part is one such as shown as 16 in FIG. 4 which has coupler segment-retaining concave cavity wall portion 18R extending beyond the vertical line VL to mating/parting line 52 of second housing part 68 (see FIG. 3) such that when coupler 22' is rotated say 90° or 270° from the position shown in FIG. 17, a portion of the coupler's convex outer wall portion 48A is slip fit engaged and retained by cavity wall portion 18R to thereby couple the device. It is also to be noted that, if this particular coupler 22' is used alone and rotated about 180° from the position shown in FIG. 17, in that new position, the coupler would have no convex outer surface wall portion to be slip fit engaged by cavity wall portion 18R, and therefore, in that position, coupler 22' will not couple the device.

FIGS. 18A and 18B are exploded, perspective views of alternative embodiments of the coupler component of this invention which illustrate two of the many various coupler segment mating/parting lines or surfaces suitable for the coupler. In FIG. 18A, a coupler, generally designated 22A, suitable for structural application, is comprised of first segment 24A and second segment 26A, each having a convex outer surface wall portion or portions 48 such that when the segments are mated, the coupler has a spherical outer surface wall and is a sphere. First segment 24A has a convex or outwardly-extending, arcuate male center stock mating/parting line or surface 58A directly or laterally mateable with a concave or inwardly extending, juxtaposingly arcuate female mating/parting line or surface 60A milled into second segment 26A. When these coupler segments are mated, the outer edges 59, 61 of their mating/parting lines or surfaces form coupler composite mating/parting line 56A (not shown) which has the same configuration as coupler CM/P line 56 of coupler 22. In FIG. 18A, each coupler segment 24A, 26A is provided with means for rotating the coupler or segment, here shown as one more access bores or sockets 36A for receiving suitable drive means such as a socket wrench (not shown). Each segment has two opposed bores or sockets permitting reception of drive means from any or all of four quadrants or directions. For such a coupler, it is understood that the extensions of the first and second housing parts used to house coupler 22A would likewise be adapted with corresponding suitably aligned access bores or sockets (not shown).

FIG. 18B nearly identical first and second segments 24B, 26B each of whose outer surface wall is convex such that when mated, these segments would comprise and form a spherical coupler generally designated 22B. In this embodiment, first and second segments 24B, 26B are identical other than for fluid flow means such as through-bore 96B, and possibly drive means if such are used. Segments 24B, 26B have angular, conical center stock mating/parting lines or surfaces 58B, 60B mateable in a direct line with each other. When these segments are mated, the M/P line or surface outer edges 59 and 61 form a coupler CM/P line 56B (not shown) having the same configuration as CM/P line 56 of of coupler 22. Second segment 26B has a through-bore 96B, which as shown in FIG. 18C is V-shaped to follow the contour of mating/parting line or surface 26B. This through-bore 96B has inwardly-angled portions extending from each mouth thereof to the apex of the bore located to the left rear of second segment 26B shown in FIG. 18C. It is to be noted that the coupling device of this invention will accommodate coupler segment through-bores and housing part channels of various suitable quantities, dispositions, alignments, configurations and combinations. For example, although not preferred, for fluid applications, the coupler of this invention could have a through-bore comprised of a portion in one segment aligned with a through-bore portion in the other segment, although for some applications, suitable sealing means may be desired to prevent leakage through or between the segments' mating/parting lines or surfaces. FIG. 18B shows an advantage, that the coupler segments can be manufactured to be identical or nearly identical, for example, one of them might have a slot therein for a socket wrench, or might have a bore therethrough.

FIGS. 19–23 show an alternative embodiment of the coupling device of this invention. More particularly, FIG. 19 shows a coupled device, generally designated 10C, comprised of a housing 12C, in turn comprised of mated first and second housing parts 14C and 16C. The coupled housing parts meet along a composite mating/parting line generally designated 50C. Each housing part has an integral member 78C, 80C each of which has suitable means such as a threaded bore 82C, (84C not shown) for receipt of and connection to a threaded or otherwise suitably adapted end of a structural item (not shown). Coupling device 10C includes means for rotating coupler 22C (not shown), here shown as including a drive shaft 32C mounted in bore 34C in extension 68C of first housing part 14C and a slotted drive socket 31C therein for receiving a socket wrench or a like member suitable for rotating shaft 32C and coupler 22C fixedly mounted thereon.

FIG. 20 shows coupling device 10C of FIG. 19 uncoupled and its housing sections 62C, 64C separated. Drive shaft 32C has been rotated clockwise 90° from its position in FIG. 19, thereby rotating first coupler segment 24C from the second position it was in in FIG. 19 to the first position in which it is shown in FIG. 20, and thereby uncoupling the device and allowing the housing sections to be separated. FIG. 20 shows that coupler first segment 24C is rotatably retained within first housing part 14C between opposed extensions 68C, in part by pin 384' extending through first coupler segment hole 40C and hole 42C in drive shaft 32C (See FIG. 21). Second coupler segment 26C is inherently rotatably retained within the cavity portion of housing part 16C; by its slip fit engagement with and by coupler segment-retaining concave cavity wall portions 46 (elsewhere also referred to as 18R) of opposed extensions 683, 684 and by opposed extensions 681, 682.

FIG. 21 is an exploded perspective view showing the main components of coupling device 10C of FIG. 19. First and second coupler segments 24C, 26C are shown in the positions they are in as they sit in their respective first and second housing parts 14C, 16C in FIG. 20. To assemble the components and form the housing sections shown in FIG. 20, coupler segment 24C is moved into first housing part 14C between extensions 68C, and, with coupler segment bore 36C aligned with extension bores 34C, 36C, shaft 32C is moved into the aligned bores and pin 384' is dropped into coupler segment hole 40C and shaft hole 42C and preferably threadedly engaged or otherwise secured to those components. Second coupler segment 26C is rotated from its reversed-C position shown, to, for example, an upstanding but angle U position as it enters the mouth 72C between second housing part opposed extensions 683, 684. Second coupler segment 26C is then fully seated within housing cavity portion 20C in faying or slip fit engagement with concave interior cavity wall 18C' of second housing part 16C. With the first and second segments respectively seated in their housing parts in the positions shown in FIG. 21, it can readily be seen that the resulting housing sections shown of FIG. 20 can be brought together and mated, as outwardly-extending, arcuate, male center stock mating/parting surface 58C is seated within concave inwardly-extending, arcuate, female mating/parting surface 60C formed in second segment 26C, and as the arcuate U-shaped ends of first housing part extensions 68C seat within the arcuate female correspondingly U-shaped recess of mouth 72C defined by surfaces 54C and 682A of second housing part extensions 681, 682.

FIG. 21A shows that when coupler segments 24C, 26C are mated, the outer edges 59C of segment 24C and the outer edges 61C of segment 26C form coupler composite M/P line 56C, which has substantially the same configuration as housing composite M/P line 50C. This can also be seen by reference to FIG. 22, a vertical section as would be taken through the device of FIG. 19 but with shaft 32C rotated to the position shown in FIG. 20. FIG. 22 shows the device uncoupled, since coupler 22C is in a first position. FIG. 22 also shows that the inner edges 51C, 53C of the first and second housing parts mating/parting lines or surface 52C, 54C substantially correspond to the outer edges 59C, 61C of first and second coupler segments' mating/parting lines surfaces 56C. This is also clearly seen in FIG. 20.

FIG. 23 shows the coupling device of FIG. 19 coupled by coupler 22C having been rotated 90° clockwise from the position shown in FIG. 22, such that it is in a second position wherein its composite mating/parting line or surface 56C does not positionally substantially correspond with housing mating/parting line 50C. In FIG. 23, portions of each coupler segment are located within, or between the extensions of, each respective housing part.

In the embodiment of the coupling device of this invention shown in FIGS. 19-23, there is shown a cylindrical cavity 20C defined by cylindrical cavity wall 18C comprised of concave cavity wall portions 18C' of each housing part, and flat cavity wall portions 18C" on the inside of extensions 68C and of extensions 681, 682, and a cylindrical coupler 22C comprised of convex outer surface wall portions 48C and flat end walls 48C' and 48C" of respective coupler segments 24C and 26C, the cylindrical coupler segment being thereby adapted for slip fit or faying engagement and retention within the cylindrical cavity wall of the housing 12C. As also previously mentioned, FIGS. 22 and 23 also show that portions 18CR of the concave cavity wall of second housing part 16C, which in these Figs. extend to the left beyond the vertical axis line VL drawn through the device and which, as shown in FIGS. 27-32, serve as coupler retaining means for rotatably retaining the coupler within the housing or housing part(s) of the device of this invention. With respect to coupling device 10C, the coupler retaining means include extensions 68C, the concave and flat cavity wall portions of each housing part, shaft 32C and pin 384' since they serve to rotatably retain coupler 22C within the housing of the coupling device. While coupler 22C and second housing part 16C are shown adapted for structural applications, it is to be understood that coupler 22C and either or both housing parts can be adapted for coupling fluid flow or other non-structural items, such that the device will have structural integrity and load bearing capacity while coupling non-structural and/or structural items.

FIG. 24, an exploded view with portions broken away of another embodiment of the coupling device of this invention, shows a coupling device generally designated 10D comprised of first and second housing parts 14D, 16D, each housing part having an integral member such as 80D having a channel (not shown), for fluid applications. Other than with respect to members 78D, 80D having channels, housing parts 14D, 16D are identical to housing parts 14C, 16C of FIG. 20. In the embodiment of FIG. 24, the coupler which would be designated 22D and would be comprised of first coupler 24D and second coupler 26D, is modified for fluid applications in that coupler 26D has a through-bore 96D extending through the center male stock thereof from one portion of the convex outer surface wall 48 to the opposed other portion thereof. First coupler segment 24D is likewise modified to have a cut-out CO formed in arcuate surface 58 D, to accommodate the center stock of second coupler segment 26D. The left hand portion of first segment 24D includes a bore 36D' to accommodate a shaft 32D' (not shown) to be entered thereinto from the left end of segment of 24D. The components of the device of FIG. 24 are assembled in a similar manner as those of FIG. 21, except that shaft 32D' is entered into bore 36D' and a pin (not shown) like pin 384 is dropped into hole 40D in coupler segment 24D and into a hole 42D in a shaft 36D' (not shown).

FIG. 25 represents another embodiment of the coupler of this invention. More particularly, FIG. 25 shows a conical second coupler segment 26C' having a convex outer surface wall 48C' and flat end walls 48C'''.

Figure 26:
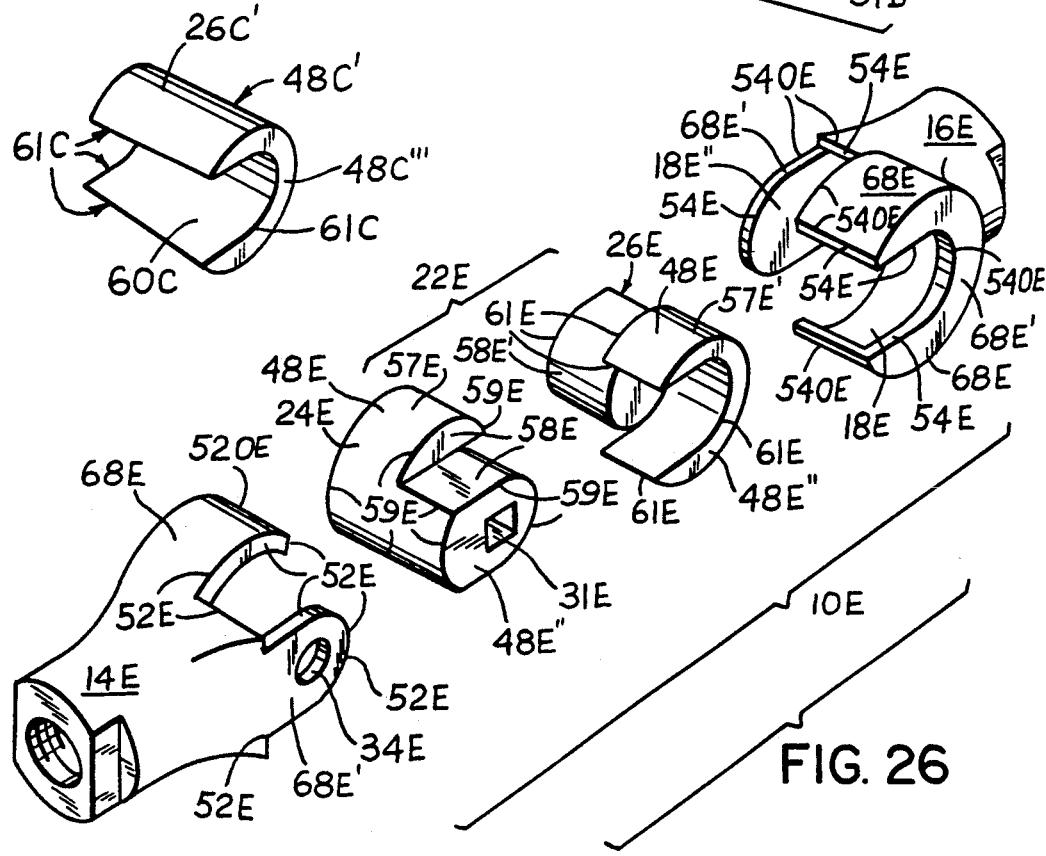
FIG. 26 is an exploded, perspective view of another embodiment of the coupling device of this invention.

FIG. 26 is an exploded perspective view of another embodiment of the coupling device of this invention. More particularly, FIG. 26 shows a coupling device, generally designated 10E suitable for structural applications and comprised of first and second housing parts 14E, 16E, and a coupler 22E comprised of nearly identical first and second coupler segments 24E, 26E. Each housing part 14E, 16E has a pair of opposed (upper and lower) extensions 68E and a pair of at least partially opposed side extensions 68E'. The coupling device housing cavity formed when the components are mated, is cylindrical as in FIGS. 19-23 and 24, and here is comprised of concave cavity wall portion 18E in second housing part 16E and a complimentary, like concave interior cavity wall portion within the opposed extensions 68E of first housing part 14E, and of the flat end walls 18E" on the inside surfaces of opposed extensions 68E' on each housing part 14E and 16E. First and second coupler segments 24E, 26E are shown in the positions they would be in as they would sit in their respect first and second housing parts 14E, 16E. First coupler segment 24E has an outwardly extending, arcuate male mating/parting surface portion 58E and alongside it and integral therewith, a C-shaped portion 57E and having substantially flat end walls 48E", and likewise second coupler segment 26E has a like outwardly-extending, arcuate male mating/parting surface 58E' and a reverse C-shaped portion 57E' and substantially flat end wall portions of 48E". The respective coupler segments are rotated to facilitate entry of, for example, the C-shaped portions of the segments into their respective housing cavity portions and then rotated back to the perspective positions in which they are shown in the drawings such that they are fully seated in slip fit engagement within the cavity walls of their respective housing parts 14E, 16E. It can be visualized in FIG. 26 that if the first and second coupler segments were mated, they would form a cylindrical coupler having a composite M/P line 56E (not shown) comprised of the outer edges 59E of mating/parting surface 58E, and the outer edges 61E of second coupler segment 26E. Likewise, it can be visualized that if the coupler segments were fully seated as disposed in FIG. 26 within their respective housing parts and the housing parts were mated, coupler 22E would be in a first position wherein its composite M/P line 56E (not shown) would positionally substantially correspond to housing composite M/P line 50E (not shown) comprised of the outer edges 520E of first housing mating/parting line or surface 52E and the outer edges 540E of the second housing mating-/parting line or surface 54E. When coupler 22E is mated within mated/housing parts 14E, 16E, the drive socket 31E in the flat end wall 48E" of the first coupler segment 24E is aligned with bore 34E in extension 68E' and is thereby ready to receive suitable drive means such as a socket wrench. Coupler 22E is in a first position and can be rotated to any second position wherein the respective composite mating/parting lines or surfaces 50E, 56E positionally substantially do not correspond.

FIGS. 27-32 show still another embodiment of the coupling device of this invention. More particularly, FIG. 27 shows a coupled coupling device, also suitable for structural applications, generally designated 10F and comprised of a housing 12F, in turn comprised of mated first and second housing parts 14F, 16F. The coupled housing parts meet along a composite mating-/parting line generally designated 50F. Each housing part has an integral member 78F, 80F which has suitable means such a threaded bore 82F (84F not shown) for threaded receipt of and connection to a threaded end of the structural item (not shown). Coupling device 10F includes a drive shaft 32F mounted in bore 34F in extensions 68F, 68F' of first housing part 14F and having a slotted drive socket 31F for receiving a socket wrench, screwdriver or like member suitable for rotating shaft 32F and a coupler 22F (not shown) having a first coupler segment integral with or fixedly mounted to shaft 32F.

FIG. 28 shows coupling device 10F uncoupled and its housing sections 62F, 64F separated. Drive shaft 32F has been rotated clockwise 90° from its position in FIG. 27, thereby rotating first coupler segment 24F from the second position it was in in FIG. 27 to the first position shown in FIG. 28. This uncoupled the device and allowed the housing sections to be separated. FIG. 28 shows that first coupler segment 24F is rotatably mounted and retained within first housing part 14F between opposed extensions 68F, 68F' by the rims of hubs H, H' at opposite ends of shaft 32F being rotatably mounted in bores 34F, 34F' in slip fit engagement within the annular surfaces 340F of extensions 68F, 68F'. (See FIG. 29). Second coupler segment 26F is rotatably retained within second housing part 16F in part by its slip fit engagement with and by coupler segment-retaining concave wall portions (not shown) of opposed upper and lower extensions 683, 684 and by opposed side extensions 681F and 682F.

FIG. 29 is an exploded perspective view showing the main components of coupling device 10F. First and second coupler segments, 24F, 26F are shown disposed in the positions they would be in as they would sit in their respective first and second housing parts 14F, 16F in FIG. 28. FIG. 29 shows that shaft 32F has Hubs H, H' at or adjacent either end thereof, and running therebetween, an integral or otherwise fixedly connected shaft portion 321F of a narrower diameter than hubs H, H'. Integral with or less preferably fixedly connected to shaft portion 321F by suitable means, is first coupler segment 24F. Shaft 321F has an extension 321F' which extends beyond Hub H' and such extension 321F' has an annular groove G therein for seating a retaining ring R therein for retaining shaft 321F' in proper rotatable position in bore 34F' of extension 68F'. To assemble the components and form the housing sections 62F, 64F shown in FIG. 28, shaft 32F is moved laterally into bore 34F', until shaft extension 321F' is fully seated within bore 34F' and the rim of Hub H' slips fit engages the inner flat cylindrical cavity wall portion 18F". Retaining ring R is then seated in groove G. With the shaft so mounted, there is formed the first housing section 62F (FIG. 28). Second coupler segment 26F is rotated from its reversed-C position shown, to, for example, an upstanding but angled U-position as it enters the mouth 72F between opposed extensions 683F, 684F of second housing part 16F. Second coupling segment 26F is then fully seated in faying or slip fit engagement within concave interior cavity wall portion 18F of second housing part 16F. With the first and second segments respectively so seated in their housing parts, the housing parts or housing sections are in the positions shown in FIG. 28 and can be readily brought together and mated in one direction or along one mating/parting axis, as outwardly-extending squared male center stock mating-/parting surface 58F is fully seated within concave inwardly-extending, squared, female mating/parting surface 60F milled into second segment 26F, and as the mating/parting surfaces 54F of opposed side extensions 681F, 682F slide over shaft portion 321F of shaft 32F.

FIG. 30 shows that when coupler segments 24F, 26F are mated, cylindrical coupler 22F is formed, wherein the outer edges 59F of segment 24F and the outer edges 61F of segment 26F form coupler composite M/P line (or surface) 56F, which has substantially the same configuration as housing composite M/P line or surface 50F (FIGS. 27 and 31).

FIG. 31, is a vertical section as would be taken through the coupling device of FIG. 27, if shaft 32F were rotated to the position shown in FIG. 28. FIG. 31 shows the coupling device uncoupled since coupler 22F is in a first position. FIG. 31 also shows that inner edges 51F, 53F of first and second housing parts' mating/parting line or surface 52F, 54F positionally substantially correspond to the outer edges 59F, 61F of first and second coupler segments' mating/parting lines or surfaces 56F. (See also FIGS. 29 and 30)

FIG. 32 shows the coupling device of FIG. 27, coupled by virtue of coupler 22F having been rotated 90° clockwise from the position shown in FIG. 31, such that in FIG. 32, it is in a second position wherein its composite mating/parting line or surface 56F does not positionally substantially correspond with housing composite mating/parting line or surface 50F. In FIG. 32, portions of each coupler segment are located within, and are rotatably retained in slip fit engagement within and by concave cavity wall portions 18FR of the second housing part extensions.

The embodiment shown in FIGS. 27-32, has a cylindrical cavity defined by cylindrical cavity wall 18F comprised of concave cavity wall portions 18F' in each housing part and flat cavity wall portions 18F" on the inside surface of extensions 681F, 682F. Cylindrical coupler 22F has convex outer surface wall portions 48F and flat end walls 48F' of coupler segments 24F and 26F, the cylindrical coupler segments thereby being adapted for slip fit or faying engagement and retention within the cylindrical cavity wall of housing 12F.

FIGS. 27-32 exemplify an embodiment wherein the shaft-mounting of coupler 22 within first housing part extensions 68F, 68F' and the slip fit or faying engagement of the convex portion or portions of the coupler segments and coupler 22F with concave cavity wall portions of each housing part 14F, 16F, especially concave cavity wall portions 18FR of second housing part 16F (FIG. 32), rotatably retain the coupler within the housing cavity. In this embodiment and in those for structural applications, although it is preferred, there need not be slip fit or faying engagement of the coupler flat end walls with flat cavity end walls of the respective housing parts. (This is not to imply that such a slip fit may or may not required for other applications.) In the embodiment shown, the flat end walls of coupler 22 are only in faying or in slip fit engagement with flat cavity end walls 18F" on the inside surfaces of extensions 681F, 682F and are not with any flat surfaces of extensions 68F, 68F' of first housing part 14F. Here, the narrow diameter shaft portions 321F of shaft 32F between the ends of coupler 22F and hubs H form a slot such that shaft 321F fits within mouth 72F and is rotatably retained within the second housing part mating-/parting surfaces 54F of a squared U-shaped cut out which defines the mouth.

Figure 33:
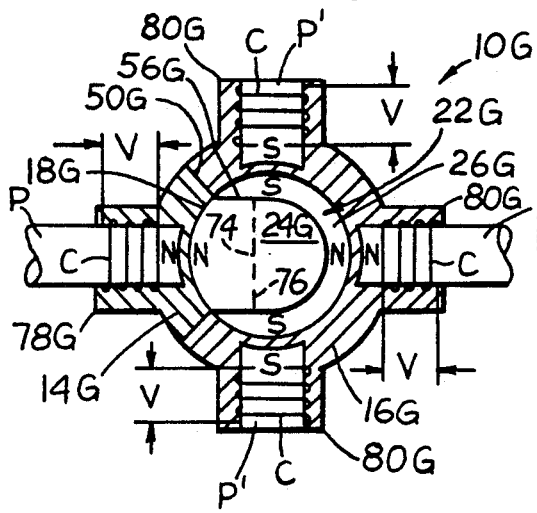
FIGS. 33 and 33A are side views in section and with portions broken away, showing another coupling device of this invention, FIG. 33 showing the device uncoupled, and FIG. 33A showing it coupled.

FIG. 33, a side view in section and with portions broken away, shows yet another embodiment of the coupling device of this invention, here generally designated 10G, comprised of a housing in turn comprised of first and second housing parts 14G, 16G. Coupling device 10G generally represents coupling devices of this invention the rotation of whose coupler is not effected mechanically or manually. FIG. 33 demonstrates that the coupler of the invention, here 22G, which mates similar to coupler 22 of FIG. 6, can be rotated by any other suitable means, for example, as shown, by electromagnetic actuation. In this embodiment, the means for rotating the coupler within cavity wall 18G comprises electromagnetic actuation means which include magnetized portions, preferably four poles located approximately 90° apart. As shown, first coupler segment 24G is magnetized adjacent its convex outer surface wall at N, and C-shaped second coupler segment 26G is magnetized adjacent its opposed convex outer surface walls in opposed legs of the reversed C-shaped segment designated S and adjacent the back wall designated N of the reverse C-shaped segment. Thus, the coupler becomes an armature by being magnetized at four poles as described, or similarly by embedding permanent magnets in suitable locations in or on the coupler segments. First and second housing parts 14G, 16G include electromagnets provided by suitable means, such as electromagnets inserted in suitable locations in the cavity wall, or as shown, members 78G, 80G have inserted therein poles P of magnetically permeable material polarized at their inner end of designated N in member 78G and in the opposed pole in member 80G, and as designated S at the inner ends of opposed poles P' in second housing part 16G. Once the housing part's 14G, 16G are brought together and mated as shown in FIG. 33, a voltage is applied by suitable means (not shown) simultaneously to all coils C, to thereby induce magnetic polarities which initially repel the coupler 22G by causing it to rotate in either direction, here clockwise, 90° to a position where the magnetized portions of the coupler are attracted to the oppositely magnetized inner end portions of the poles P and P'.

Figure 33A:
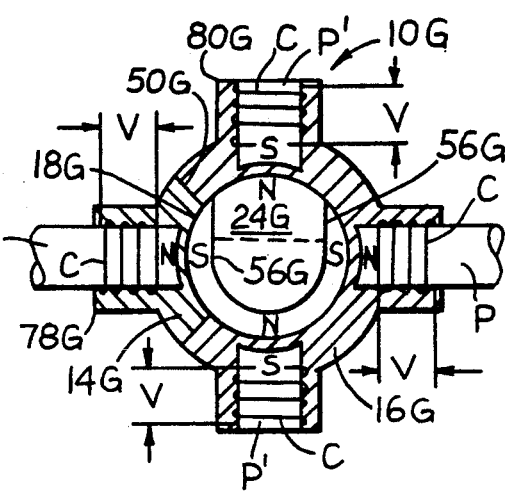

FIG. 33A shows coupler 22G rotated by the applied voltage from its first position shown in FIG. 33, 90° clockwise to a second position shown in FIG. 33A, which couples the device since coupler CM/P line 56G does not positionally substantially correspond with housing CM/P line 50G. Coupler 22G is rotated back to the first position shown in FIG. 33, when voltage is applied by suitable means to all coils C in reverse polarity (as compared to the polarity of the voltage applied for rotating the coupler to a coupling second position). In the first position, the coupler CM/P line or surface 56G positionally substantially corresponds with the housing part CM/P line or surface 50G to thereby render the device in a mated, uncoupled mode. Although less preferred, in this embodiment less than four poles can be utilized, e.g. two can be employed for each of the housing and coupler. The embodiment shown in FIGS. 33 and 33A can be employed for appropriate applications, including fluid applications. The application of the voltage need not be effected at the coupling device. It may be effected from a remote location. FIGS. 33, 33A are intended to exemplify embodiments wherein the means for rotating the coupler include suitable power supply means, control means (not shown) such as including a computer, a program, and signal-generating means remotely located relative to the coupling device, and response means associated with the coupler for responding, as to a signal imparted from the signal-generating means.

Figure 33B:
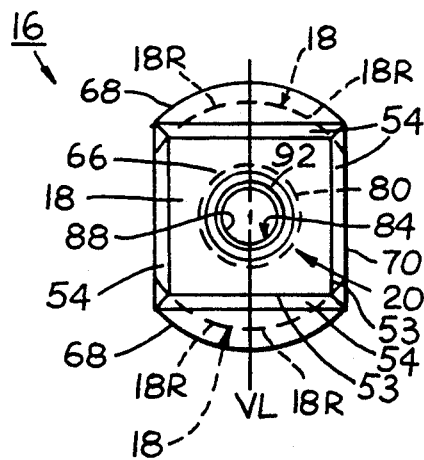
FIG. 33B is a front view looking into the mouth of the second coupler segment shown in FIG. 4.

FIG. 33B, a front view looking into the mouth of second housing part 16 of FIG. 4., shows mating/parting line or surface 54 having inner and outer edges 53 and 70. FIG. 33B shows concave cavity wall portions 18 (dashed lines) in opposed extensions 68 are dome-shaped and have portions designated 18R extending in this view to the left and right of line VL which is drawn perpendicular to the axis of segment rotation in the embodiment of FIGS. 1-3. Concave cavity wall portions 18R here are clearly shown to be complementary arcs which extend from the line VL toward or to the mating/parting line or surface 54 and its inner edge 53. These concave cavity wall portions 18R preferably slip-fit engage and rotatably retain one or more coupler convex outer surface wall portions or portions of it surface(s) of revolution whether or not the coupler is shaft-mounted.

Figure 33C:
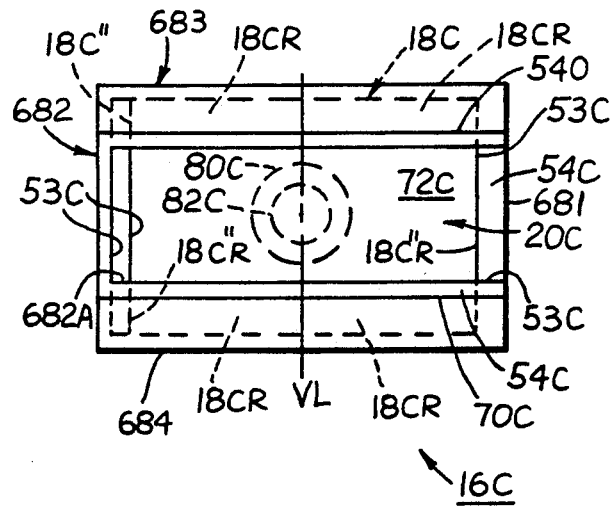
FIG. 33C is a front view looking into the mouth of the second segment shown in FIG. 21.

FIG. 33C, a front view looking into the mouth of second housing part 16C of FIG. 21, shows second housing part 16C having a cylindrical cavity 20C defined by cylindrical cavity wall portions 18C, 18CR, 18C" and 18C"R. In the second housing part shown in FIG. 33C, the coupler-retaining means includes not only concave cavity wall portions 18CR adjacent to the forward end portions of extensions 683, 684 (see also FIGS. 22, 23), but also flat cavity side wall surface portions 18C" and 18C"R which cooperate with inside cavity wall surface portions 18C" of first housing part opposed extensions 68C. These side wall portions cooperate to form the side walls of mated coupling device 10C and help rotatably retain coupler 22C (not shown here; see FIG. 21) from moving in any lateral direction common or parallel to the axis of rotation of coupler 22C.

FIGS. 34-38 show yet another embodiment of the coupling device of this invention. More particularly, FIG. 34 shows a coupled coupling device, generally designated 10H, preferably suitable for structural applications, comprised of first and second housing parts 14H, 16H which meet along a composite mating/parting line generally designated 50H. Each housing part has a integral member 78H, 80H and a threaded bore 82H (84H not shown). The first housing part extension 68H has a bore 34H therein in which is visible first coupler segment 24H having means such as slotted drive socket 31H therein for receiving a socket wrench or like suitable member, for rotating coupler 22H (not shown).

FIG. 34A shows the main components of coupling device 10H. First and second coupler segments 24H, 26H of coupler 22H are nearly identical and are shown in the positions they are in as they sit in their respective first and second housing parts 14H, 16H in FIG. 34. To assemble the components, the first and second coupler segments are inserted into their respective housing parts 14H, 16H and fully seated within each('s) respective concave cavity portion 20H in faying or slip-fit engagement with segment-retaining concave interior cavity wall portions 18H of the housing parts (See also FIGS. 35–38). With the first and second segments respectively so seated and inherently retained in their respective housing parts, the resulting housing sections 62H, 64H can be brought together and mated, as the mating/parting surface 58H (not shown) of first coupler segment 24H, and 60H of second coupler segment 26H are brought into face-to-face abutting contact, as are the respective first and second housing part mating/parting lines or surfaces 52H, 56H, to thereby mate the housing parts and device in an uncoupled mode. FIG. 34B shows that when coupler segments 24H, 26H are mated, the outer edges 59H of segment 24H and the outer edges 61H of segment 26H form coupler composite mating/parting line 56H which, as preferred, has substantially the same configuration as housing composite M/P line 50H shown in FIG. 33.

FIGS. 35–38 are vertical sections with portions broken away. FIGS. 35 and 36 are vertical sections as would be taken along lines 35—35 and 36—36 of FIG. 34A, if the components were mated and coupler 22H were rotated counter clockwise 90° from the coupling position it is in in FIG. 34 (and in FIGS. 37, 38). More particularly, FIG. 35 shows the device uncoupled, since coupler 22 is in a first position wherein the housing and coupler mating/parting lines or surfaces 50H, 56H substantially correspond. Clearly, the respective housing parts can be separated from each other. FIGS. 35 and 36 show that coupler-retaining concave cavity wall portions 18HR of second coupler segment 16H extend to the left of vertical line VL toward mating/parting line 56H, slip-fit engage the convex outer surface wall of second coupler segment 26H, and thereby rotatably retain coupler segment 26H within cavity 18H. In FIGS. 35 and 36, first coupler segment 24H is wholly within or retained by the concave cavity wall portions, e.g. 18R of first housing part 14H, and coupler segment 26H is wholly within or retained by the concave cavity wall portions of second housing part 16H.

FIGS. 37 and 38, vertical sections taken along lines 37—37 and 38—38 of FIG. 34, show the coupling device coupled by coupler 22H having been rotated clockwise 90° to a second position, from its first position shown in FIGS. 35, 36. In the second position, the housing and coupler mating/parting lines 50H, and 56H do not positionally substantially correspond, since, for example, horizontally-disposed mating/parting line 56H and mating/parting surfaces 60H are perpendicular to the vertical portion of housing mating/parting line 50H on the side of the device shown in FIG. 34. In FIGS. 37 and 38, portions of first coupler segment 24H are located in each housing part 14H, 16H, and they are inherently retained therein by the concave cavity wall portions 18HR of the first and second housing parts extensions.

In the embodiment of the coupling device shown in FIGS. 34–38, housing cavity 20H and coupler 22H are cylindrical, and when the housing parts are mated, the flat end walls 48H' and 48H" of the first and second segments are in faying or slip-fit engagement with and rotatably-retained by the inside, flat surfaces of the walls of first and second housing part side extensions 68H, 68H' (not shown), 681H and 682H.

Figure 39:
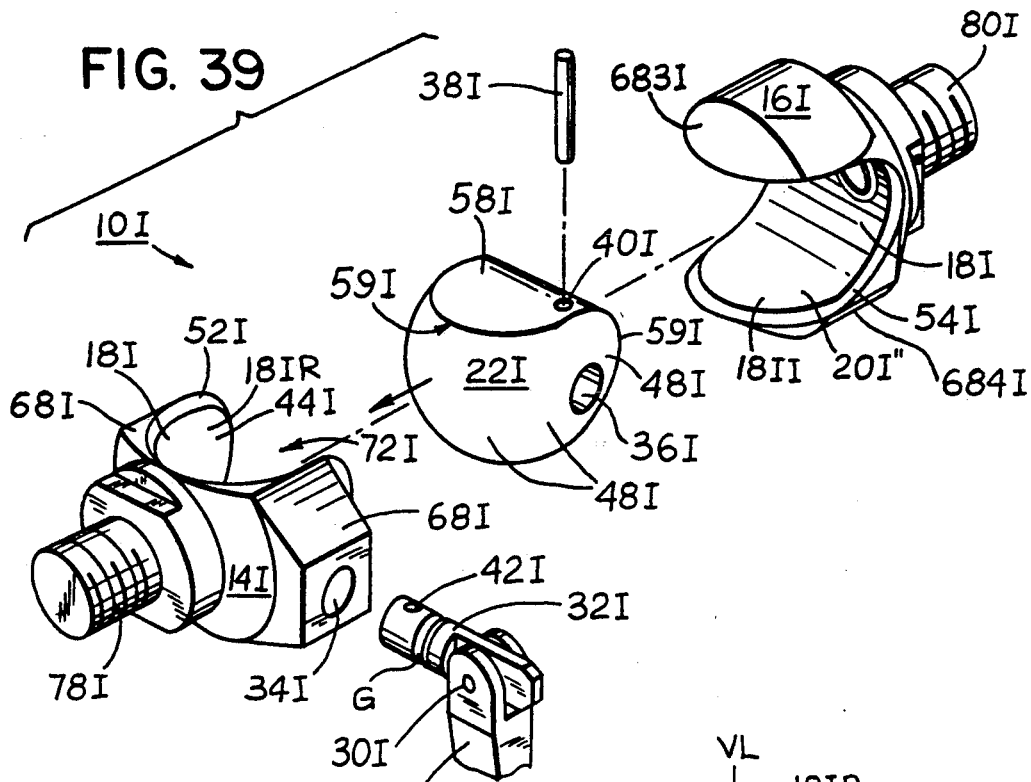
FIG. 39 is an exploded perspective view of components of yet another embodiment of the coupling device of this invention.
Figure 40:
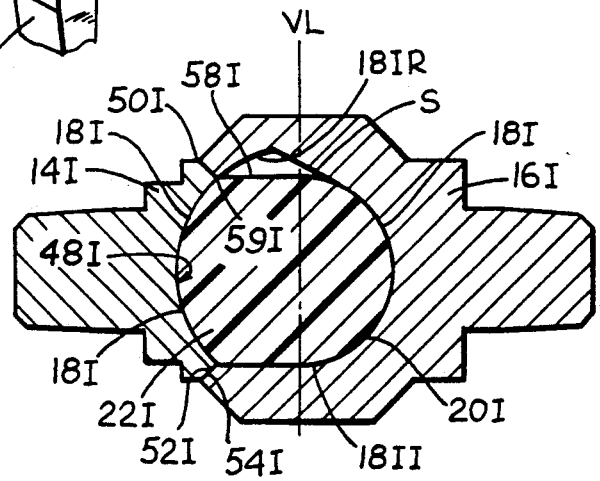
FIG. 40 is a vertical section as would be taken through the center of the device if it were assembled.

The coupler of this invention can be integral or comprised of only one element, piece or segment. This is clearly represented in FIGS. 39 and 40. FIG. 39, shows a coupling device 10I which, when mated and coupled, would appear the same as coupling device 10 of FIG. 1. Coupling device 10I is comprised of first and second housing parts 14I, 16I and an integral, one-piece coupler 22I, comprised of only one segment. First housing part 14I, is shown identical to first housing part 14 of FIGS. 1–15, except that it is shown here with an externally-threaded, solid, integral member 78I. Coupler 22I has rear and opposed side convex outer wall surface portions 48I, and it has an outwardly-extending arcuate male center stock surface 58I with a hole 40I therein and communicating with coupler bore 36I. These components preferably are assembled in a manner similar to those of coupling device 10 in that coupler 22I, for example, can be rotated and entered into mouth 72I of the first housing part and then rotated again to be fully seated within concave cavity 18I in the position in which the coupler is shown in FIG. 40, such that its convex outer surface wall is in faying slip-fit engagement with the first housing part concave cavity wall 18I. Once seated therein, shaft 32I is connected to coupler 22I by use of pin 38I to thereby form a first housing section (not shown). Second housing part 16I can then be mated to first housing part 14I such that the arcuate surface 58I of coupler 22I seats fully in cavity portion 20I" in faying or slip-fit engagement with concave cavity wall portion 18I at the rear wall of C-shaped second housing part 16I. In this embodiment, the second housing part's lower extension 684I does not have a segment-retaining concave cavity wall portion which would be designated 18IR, but rather has a substantially planar portion 18" which merges into concave portion 18I. Note, however, that as will be explained in connection with FIG. 40, upper extension 683I has a coupler or segment-retaining concave cavity wall portion 18IR (shown in FIG. 40) for retaining the coupler or segment within the second housing part.

FIG. 40, a vertical section as would be taken through coupling device 10I if it were mated and uncoupled, shows coupler 22I seated in a first position within concave cavity 20I such that its convex outer surface wall 48I and the opposed, arcuate, i.e., convex portion of mating/parting surface 58I is in slip-fit engagement with the concave cavity wall portion 18I of the first and second housing parts. In FIG. 40, housing composite mating/parting line or surface 50I and coupler mating/parting line or surface 59I positionally substantially correspond. In this embodiment, the device is coupled by rotation of coupler 22I clockwise some sufficient degree until it is in a second position wherein mating-/parting lines or surfaces 50I and 59I no longer positionally substantially correspond and a portion of coupler convex outer surface wall 48I is slip-fit engaged and retained by a portion of second housing part concave cavity wall portion 18IR. Preferably, the coupler is rotated to the full extent permitted, until its surface 58I abuts cavity stop wall portion S. With coupler 22I so rotated, it would be in a second position wherein the mating/parting lines or surfaces 50I, 59I would not positionally substantially correspond, as the latter would be at the junction of cavity wall portion 18IR and stop wall S. FIG. 40 exemplifies that the coupler and cavity wall portions may have any of various cooperative shapes and elements including stop means such as stop wall S utilized and positioned anywhere suitable within the cavity or housing while still being within the concept of the invention, wherein a coupler or coupler segment is moved from a first non-coupling position wherein it is not engaged or slip-fit engaged and retained by portions of each housing part, to a second, coupling position wherein it is so engaged and retained by portions of each housing part, preferably by the the concavely-contoured cavity wall portion(s) of both housing parts.

The coupler of this invention can have any suitable shape so long as it has a convex outer surface wall portion such as 48I which has sufficient surface area to be simultaneously slip-fit engaged by a coupler-retaining concave cavity wall portion of the first and second housing parts, preferably each housing part, so as to thereby prevent parting and thereby couple the housing parts. Likewise the cavity wall of second housing part 16I can be of any suitable shape, size contour or configuration to correspond to the size, etc. and function of the coupler segment. In the embodiment shown in FIG. 40, the opposed convex outer surface walls 48I of coupler 22I are rotatably retained by and within the concave cavity wall portions 18IR of first housing part extensions 68I. Although it is not needed, segment 22I is also rotatably retained by shaft 32I and pin 38I. It is to be noted that the wall portions which define the cavity need not be integral with one or more of the housing parts. For example, the stop wall S may be provided by one or more suitable inserts.

Another embodiment exemplifying couplers of this invention which comprise only one element, piece or coupler segment can be seen by referring to coupler first segment 24 shown in FIGS. 6, 10 and 11, if second coupler segment 26 were removed from and not employed in the device. Housing parts 14 and 16 would still be coupleable by mere rotation of first coupler segment 24 to some degree sufficient that a portion of its convex outer surface wall 48 is slip-fit engaged within and retained by a concave cavity wall portion of each housing part. This can be easily seen in FIGS. 10 and 11 wherein, first coupler segment 24 is in respective second positions wherein its mating/parting line 56 does not positionally substantially correspond with the position of housing composite mating/parting line 50 and the housing parts are clearly coupled. Still another exemplary one-piece coupler would be coupler 22' of FIGS. 16 and 17 were that coupler utilized with a second housing part such as designated 16 in FIG. 4. Thus, within the concept of the invention are embodiments exemplified, for example, in FIGS. 39 and 40, wherein, when the housing parts are mated and uncoupled, a single coupler segment is rotatably-retained in only one housing part preferably by the contour of, e.g., opposed concave cavity wall portions of the extensions of that housing part, and when the device is coupled, the coupling segment is in a second position wherein the segment is rotatably retained preferably by concavely contoured cavity wall portions of each housing part.

Figure 41:
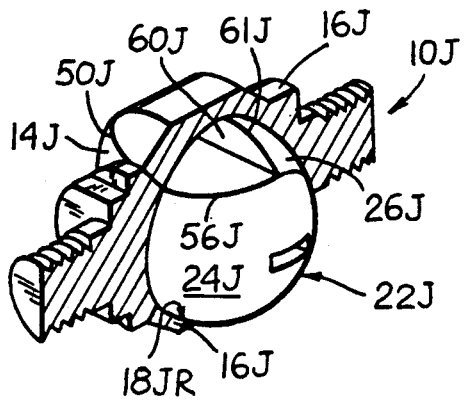
FIGS. 41 and 42 are perspective views, partly in section, of an alternative embodiment of the coupler of this invention, FIG. 41 showing the device mated and uncoupled and FIG. 42 showing it mated and coupled.
Figure 42:
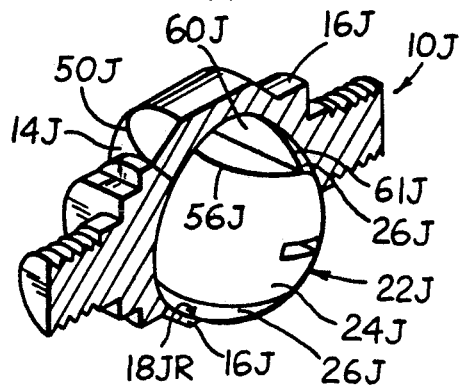

In view of the above discussion with respect to FIGS. 39 and 40 wherein the coupler only includes a first coupler segment, it will be apparent that the invention also includes embodiments wherein the coupler is comprised of two suitable segments but wherein one or more segments has a portion or portions thereof missing. FIG. 41 shows coupling device 10J comprised of mated but uncoupled first and second housing parts 14J, 16J, and of a coupler 22J in turn comprised of mated first and second coupler segments 24J, 26J, wherein the latter, 26J, has a portion of its top portion cut away thereby leaving a second coupler mating/parting surface or line 60J having an outer edge 61J. In FIG. 41, coupler 22J is in a first position wherein it has a partial composite mating/parting line or surface 56J (which includes surface 60J and edge 61J), which is functional in a mating/parting/coupling sense in accordance with this invention and therefore is considered to be substantially of the same configuration as and to positionally substantially correspond with housing CM/P line 50J. In FIG. 42, the device 10J is coupled in that coupler segment 22J has been rotated some sufficient degree to a second position wherein its M/P line 56J does not positionally substantially correspond with housing CM/P line 50J. This embodiment and previous embodiments (e.g., in FIGS. 39 and 40), clearly exemplify that within the scope of this invention, the mating/parting line of the coupler or segment(s) need not be entirely of the same configuration or entirely or at all composite. This embodiment also shows that the M/P lines of the coupler and housing need not fully correspond with the M/P line of the housing parts when the coupler is in a first position. In FIG. 41, the mating/parting line 56J of coupler 22J only partly positionally substantially corresponds with housing CM/P line 50J, yet the coupler is functional, for when coupler 22J is in a first position, housing parts 14J, 16J can be readily separated, and when coupler 22J is in a second position as in FIG. 42, they cannot and the housing parts are coupled.

In accordance with the concepts of this invention, the respective housing and coupler mating/parting lines are to be understood to positionally substantially correspond when the coupler or segment(s) is or are in a first position wherein its or their mating/parting line(s) or surface(s) relative to that or those of the housing or housing parts, allow(s) mating or parting, i.e., in such position, no portion or surface of the coupler or segment(s) or of its or their mating/parting line or surface prevents mating or parting so that the housing parts can be separated. The respective housing and coupler mating/parting lines or surfaces are to be understood to not positionally substantially correspond when the coupler or segment(s) is or are in a second position wherein the mated coupler's mating/parting line(s) or surface(s) relative to that or those of the housing or housing parts, prevent parting, i.e., in a second position, a portion or surface of the coupler or segment(s) or of its or their mating/parting line or surface prevents parting so that the housing parts are coupled. This above understanding applies broadly no matter what the respective shapes, configurations, contours or topographies of the respective housing and coupler mating/parting lines or surfaces. Accordingly, as to the mating/parting lines or surfaces, it is to be understood that the words positionally substantially corresponds includes situations in which only a portion or portions of the mating/parting line or surface of a coupler or segment is or are operative, i.e. functionally positionally permits or prevents parting relative to a portion of the mating/parting line of the housing, in the sense that said only portion or portions at least partly effect or determine whether the housing parts can be separated or not, or are coupled or not. When the coupler or coupler segment(s) is or are in a second position, the device is coupled in part because a portion of the coupler or coupler segment is slip-fit engaged directly or indirectly by or with and rotatably retained directly or indirectly by coupler-retaining means of the housing part(s), preferably by a shaft through one housing part, and preferably also by a cavity wall portion, preferably the contour, e.g., the overbiting concave contour of a cavity wall portion, of one (usually the other) housing part, or more preferably of each housing part.

In accordance with this invention, the housing is comprised of two or more housing parts which are mateable and which when mated form an interior cavity adapted to house and rotatably retain a coupler therein, and whose cavity wall or surface which defines the cavity, defines at least a portion of a, preferably an entire, surface of revolution. The portion of or entire surface of revolution can be continuous or interrupted and can be of any suitable size, shape, contour or configuration. It need not but can be selected from the group consisting of spherical, cylindrical, conical, ellipsoidal, oval, oblong and combinations thereof. Most preferably, the portion of or entire surface of revolution is concave and is entirely spherical, less preferably, partly spherical or partly or entirely cylindrical.

The coupler of this invention can be one-piece, as when it is a single coupler segment, or it can be comprised of a plurality of mateable or mated segments. Preferably, the coupler comprises at least a portion of a body of revolution, and the coupler, or at least two of the mated segments, has or have an outer wall or surface portion(s) which defines at least a portion of a, preferably an entire surface of revolution.

As with the housing parts, the coupler outer surface wall portion(s) of or entire surface(s) of revolution can be continuous or interrupted and can be of any suitable size, shape, contour or configuration. It need not but can be selected from the group consisting of spherical, cylindrical, conical, ellipsoidal, oval, oblong and combinations thereof. Most preferably, the coupler or coupler segment portion or entire surface of revolution is convex and is entirely spherical, less preferably, partly spherical or partly or entirely cylindrical. Most preferably, its portion(s) of or entire surface of revolution corresponds in size, shape, contour, etc to the portion or entire surface of revolution of the housing cavity wall or housing part cavity wall portions.

The extent of surface area of the portion(s) of surface of revolution of the housing parts and of the coupler or coupler segments must be sufficient for that or those of the latter to be slip fit engaged by that or those of the former, and sufficient to thereby prevent parting of the housing parts when the coupler or coupler segments is or are in a second position. Preferably, the extent of surface area of the portion(s) of surface of revolution of the coupler or coupler segments must be sufficient to be slip fit engaged by the coupler-retaining concave cavity wall portions of at least one, preferably each housing part, so as to rotatably retain the coupler or coupler segments in the housing or housing parts, whether the housing parts are coupled or not. The portions of or the entirely of the surfaces of revolution of the respective housing or housing parts and of the coupler or mated coupler segments have at least one common axis.

The mating/parting lines or surfaces of the respective housing parts and coupler or coupler segments can be continuous or interrupted and can be planar, arcuate, or of any suitable size, shape, contour, configuration or topography. The mating/parting lines preferably are continuous and are in the form of arcuate surfaces or planes or combinations thereof. When the cavity and coupler are spheres or spherical, as shown, for example, in FIGS. 1–17, preferably, the respective housing part and coupler mating/parting lines or surfaces each comprise a continuous line or surface formed by two pairs of 180° circular arcs generated by a 45° radial extending from the center of the coupler, the two arcs of said one pair being parallel to each other and facing in the same direction, and the two arcs of the other pair being parallel to each other and facing in the opposite direction from and being in different planes than the arcs of the other pair. Although the housing part and coupler mating/parting lines can permit mating and parting in more than one direction, preferably they permit mating/parting in only one direction, and preferably the mating/parting surfaces are inherently self-aligning, as when they are disposed 90° out of phase (housing part to housing part, and coupler segment to coupler segment) and at a suitable angle, e.g. 45° as shown in FIGS. 1–6, which facilitates mating and parting.

In accordance with the invention, "mating/parting line" is meant to be broadly understood to include the mating/parting surface(s), edge(s), point(s), portion(s) or line(s) of the individual coupler segment or housing part which abut(s), or is or are near or adjacent to and/or juxtaposed with and meet(s) or mate(s) with the mating/parting line or surface(s), edge(s), point(s), portion(s) or lines of the other coupler segment(s) or housing part(s) it respectively meets or mates with. It is also meant to include the respective coupler composite and/or housing composite mating/parting line of the mated coupler segments or mated housing parts, as the case may be. The composite mating/parting line refers to the joint or line at and/or along the points, places or edges of the housing parts where the housing parts meet, or are near, adjacent, proximate or juxtaposed to each other when they are mated. The same applies to the composite mating/parting line of the coupler segments when they meet or are mated. It is to be understood that the words mating/parting lines apply to one-piece couplers having an outer edge, line or surface, at least a portion of which is identical to or resembles the mating/parting line of either or both housing parts, and/or at least a portion of which, when the coupler or segment is a first position, relative to the housing mating/parting line, permits mating/parting of the housing parts, and which, when the coupler or coupler segment is in a second position, is utilized to effectuate or participate in effectuating the prevention of parting of the housing parts, i.e., in coupling of the device. What has been stated above with respect to the mating/parting line of the one-piece coupler also applies to the mating/parting line of any coupler or coupler segment(s).

Mating/parting lines of housing parts and coupler or coupler segments are to be understood to positionally substantially correspond not only when they actually fully do, but also broadly when they fully do not, as when their relative positions correspond partly or enough such that the housing parts and coupler segments permit mating/parting or uncoupling of the device (housing parts and coupler) in at least one direction. Conversely, the mating/parting lines are to be understood to not positionally substantially correspond, when they do not correspond enough such that a portion of the coupler or coupler segment is in a position which couples the device, i.e., prevents parting or uncoupling of the device or housing parts in any direction. Thus, as exemplified in FIGS. 41 and 42, wherein the housing and coupler mating/parting lines do not exactly substantially correspond or have the same configuration, the device still can be coupled in accordance with this invention. It is also exemplified, for example, by reference to disclosures of the use of a one-piece coupler. Likewise, when mating/parting lines of housings or housing parts are said herein to have "substantially the same configuration", this is to be understood to mean their configurations are close enough that the mating/parting lines function to permit mating/parting when the coupler rotatably-retained in a first position within the housing, and to prevent parting and cause coupling of the device when the coupler is rotatably-retained in a second position within the housing. The words positionally substantially correspond, and substantially the same configuration also mean that the coupler segments can be mated/parted in at least one direction which is common to a direction of mating-/parting of the housing parts.

In accordance with the coupling concept, method and device of this invention, each housing part has coupler-retaining means for rotatably-retaining the coupler or a coupler segment in the housing cavity or in a housing part cavity portion. The coupler-retaining means can be or include one or more shafts or members which provide(s) a fixed axis of rotation for a coupler or coupler segment, and/or it can be or include a portion or portions of the interior cavity wall, which portion(s) can be or include flat or planar portions, but preferably, they are or include a concave cavity wall portion of the or each housing part. Preferably, one or more shafts or members provides a fixed axis in one housing part and there is coupler-retaining means of another type in that, another or each housing part. In accordance with this invention, the coupler-retaining means provided in the housing part other than the shaft-bearing one, or in each housing part, comprises the cavity wall portion of or the entire surface of revolution of the cavity wall of that or each housing part. More particularly, and as exemplified in the drawings, the coupler-retaining means of the or each housing part preferably comprises the concave cavity wall portion, i.e., the concave cavity wall portion of surface of revolution which engages, preferably slip-fit engages, and rotatably retains the coupler or coupler segment within the housing cavity or housing part cavity portion. Preferably, this coupler-retaining concave cavity wall portion, exemplified, for example, in 18R in FIG. 3, is that portion which is a concave arc of curvature which extends from or is located outward from or in some cases to either side of an imaginary vertical line exemplified as VL [shown in FIGS. 3, 9A–11A, 12–15, 22, 23, 31, 32, and 35–38, (the line VL being drawn, for example, through the center of the housing, usually perpendicular to the longitudinal axis of the device or to the axis of flow through the device, e.g., through the center of opposed extensions of a housing part)], toward or to the mating/parting line or surface or edge, of the housing part or extension which defines the mouth between the extensions. Elsewise stated, preferably, the coupler-retaining means comprises that concave cavity wall portion of the housing part which, when viewed in section, through a cut made perpendicular to or along the or a coupler's or coupler segment's axis of rotation, forms or has or is an arc greater than 180°, i.e., it comprises the or a portion of an arc which is an extension beyond a real or imaginary arc of 180°. For example, in FIG. 3, the sectional view is along the line VL along the axis of rotation, whereas in FIG. 43 the view is along the line VL perpendicular to the axis of rotation. The arc or portion or entire surface of revolution must have sufficient or enough surface area, overhang or overbite to rotatably retain the coupler or coupler segment in the cavity, or housing part(s) and to effect coupling, when the coupler or segment is in a second position by providing enough area of abutting slip-fit engaged overbiting surfaces of revolution of the cavity wall portion and coupler or coupler segment so as to prevent parting or decoupling of the mated housing parts. Preferably, the coupler-retaining concave cavity wall portion is a portion of or the entirety of a complementary arc which extends outward from or to either side of the line VL, or beyond the real or imaginary arc of 180° as previously explained. Also, preferably, the concave cavity wall portions which overhang or overbite the coupler are facing or at least partially opposed to each other, preferably on likewise facing or partly opposed extensions.

When a coupler segment is shaft-mounted to have a fixed axis in one housing part, the or each other housing part preferably has such a coupler-retaining concave cavity wall surface of revolution portion. Preferably, the housing part which has the shaft also has such (a) portion(s). When there is no fixed axis of rotation provided, preferably each housing part has the coupler retaining concave cavity wall portion(s). Thus, preferably, the coupler has or coupler segments have a convex surface of revolution portion of sufficient area to exist in, cooperate with and be slip fit engaged by a concave cavity wall portion of both housing parts, each housing part has a concave cavity wall portion which provides a portion of a surface of revolution sufficient to slip-fit engage a portion of the surface of revolution portion of the coupler or coupler segment, the surfaces of revolution of the coupler or segment and the housing part concave cavity wall portions have a common axis, and, a sufficient area of those portions of surfaces of revolution are slip-fit engagable with each other so as to cause coupling. Accordingly, when the coupler or segment(s) is or are in a first position wherein the mating/parting lines of the housing and coupler or a segment positionally substantially correspond and/or a sufficient portion of the coupler or of a coupler segment's convex outer wall surface of revolution portion(s) does not engage a sufficient concave cavity wall surface of revolution portion of each of both or each of the housing parts, as to prevent parting of the housing parts, the device can be parted; and, when the coupler or segment is rotated to a second position wherein the mating/parting lines do not positionally substantially correspond, and/or a sufficient portion of the concave cavity wall surface of revolution portions of the housing parts does slip fit engage and rotatably retain the coupler or segment(s)' convex outer wall surface of revolution portions as to prevent parting, the coupling device is coupled. When there is sufficient engagement of portions of the surface(s) of revolution of the coupler or coupler segment(s) with that or those of the housing parts, the coupler or segment(s) prevent(s) parting or separation of the housing parts in all axes of mating/parting and thereby couples the device.

It is to be noted that the words concave, convex, arcuate, dome-shaped, cylindrical, etc. as utilized herein, are to be understood as meaning when viewed in a section taken through the element or component of the device in question, as exemplified by the views shown in the drawings. It is also to be noted that references herein to the coupler or to either or both segments being retained or restrained from moving in any linear direction is to be understood to mean restraint from substantial movement in any linear direction, such that minor movements as a result of machine tolerance or for other reasons, which do not significantly negatively affect the operation and performance of the coupling device, for example, which do not cause unacceptable leakage for a fluid application, are not considered to be substantial movements. It is to be further noted that the coupling devices of this invention which are shown for structural applications can be adapted for coupling other items, e.g. fluids, and those shown for fluid applications can be adapted for structural applications. The coupling devices of this invention have structural integrity and load-bearing capacity though they may couple other items.

Although the drawings show embodiments of coupling devices most of whose couplers are rotatable about a single axis, this invention includes coupling devices whose couplers e.g. spheres are rotatable about multiple axes. Also, a plurality of shafts can be employed, say for example, two, wherein each is connectable to the coupler or to different segments, through access means such as a bore in one or both extensions of each or different housing part, for example, one shaft being connectable to a first coupler segment through a bore in a first housing part extension, and a second shaft being alternatively or selectively connectable or engagable with the same segment or a second coupler segment through a bore in a second or other housing part extension. Coupling devices also within the scope of this invention include those whose means for rotating the coupler or coupler segment comprise response means, and whose rotation is actuated by self-contained or remote control means.

The coupling devices of this invention can be made of any suitable material(s). Although the housing parts and coupler of the preferred embodiment shown in FIGS. 1-15 preferably are constructed of stainless steel, they, as well as any or all of the other embodiments and major components, can be constructed of other suitable materials, including, for example, but not limited to wrought, forged, cast or hot isostatic pressed metals such as alloys of aluminum, copper, nickel and titanium. Non-metalic materials, e.g., various plastics and ceramics can also be employed, the selection of any of these materials and combinations thereof being dependent, of course, on the application of the coupling device. The components of the coupling device of this invention can also be fabricated from special materials, e.g., those especially suited for structural applications where active or passive joint load control is desired. These special materials can be selected from the group consisting of shape-memory, magnetostrictive alloys, piezoceramics, and electrostrictive ceramics. Also, electrorheological materials, for example, fluids, can be employed as desired, for example for providing temporary structural rigidity or tightness of mating and/or faying surfaces when such is needed, while allowing rotary or other relative motion between components or surfaces at other selected times.

What is claimed is:

1. A coupling device, comprised of
   a housing having an interior cavity wall which defines a cavity adapted to rotatably retain a coupler therein and to have a portion of a concave surface of revolution,
   means for rotatably retaining a coupler within the cavity,
   a rotatable coupler rotatably retained within the cavity,
   means for rotating the coupler within the cavity,
     the housing being comprised of mated first and second housing parts, each having a cavity wall portion which includes a portion of said concave surface of revolution portion,
     the coupler having one or more convex outer surface wall portion(s) which include(s) a portion of a convex surface of revolution adapted to rotatingly slip fit engage a portion of said cavity wall surface of revolution portion of each housing part,
     said housing parts being uncoupled and partable when said coupler is in a first position wherein it allows mating and parting of the respective housing parts, and said housing parts being coupled and not partable when said coupler is in a second position wherein one or more of its convex wall portion(s) is or are slip fit engaged by one or more of said coupler retaining concave cavity wall portion(s) of each of the first and second housing parts, to thereby prevent parting of and thereby couple the housing parts.

2. The coupling device of claim 1 wherein the coupler is comprised of first and second coupler segments, each having said one or more convex outer surface wall portions.

3. The coupling device of claim 2, wherein each housing part is adapted to house and retain a segment seated therein from moving in any linear direction.

4. The coupling device of claim 2 wherein one housing part has means for rotating a coupler segment about an axis running through that housing part.

5. The coupling device of claim 1, wherein at least one housing part has one or more cavity wall portion(s) adapted to rotatably retain the coupler in the housing.

6. The coupling device of claim 1, wherein each housing part has one or more cavity wall portion(s) adapted to rotatably retain the coupler in the housing.

7. The coupling device of claim 1, 3, 4 or 6 wherein the coupler is comprised of first and second segments mated along a mating/parting line,
   the housing being comprised of first and second housing parts mated along a mating/parting line,
   said coupling device being uncoupled when said coupler is in a first position wherein said mating/parting lines positionally substantially correspond and said device being coupled when said coupler is in a second position wherein said mating/parting lines positionally do not substantially correspond.

8. The coupling device of claim 7 wherein said mating/parting lines of said housing and coupler have substantially the same configuration.

9. The coupling device of claim 1 wherein the surface of revolution of the housing parts and coupler is selected from the group consisting of spherical, cylindrical, conical, ellipsoidal, oval, oblong and combinations thereof.

10. The coupling device of claim 9 wherein the surface of revolution is continuous.

11. The coupling device of claim 9 wherein the surface of revolution is interrupted.

12. A coupling device, comprised of
a housing having an interior cavity wall which defines a cavity adapted to rotatably house a coupler therein,
a coupler rotatably housed in slip fit association with the cavity wall and within the cavity, the coupler being comprised of first and second segments mated along a mating/parting line,
means for rotating the coupler within the cavity, and
means for retaining the coupler within the cavity,
the housing being comprised of first and second housing parts mated along a mating/parting line, each housing part including a portion of the coupler retaining means adapted to rotatably retain a coupler segment in the housing part,
said mating/parting lines of said housing and coupler having substantially the same configuration, said coupling device being coupled or not depending on the position of said coupler in said cavity and the position of said mating/parting lines relative to each other, said coupling device being uncoupled when said coupler is in a first position wherein said mating/parting lines positionally substantially correspond and said device being coupled when said coupler is in a second position wherein said mating/parting lines positionally do not substantially correspond, said means for rotating being adapted to effect rotation of said coupler to a said position and to a said second position.

13. The coupling device of claim 12 wherein the portion of the coupler retaining means of the first housing part comprises pivot means for pivoting the first segment about an axis of rotation within the first housing part.

14. The coupling device of claim 12 wherein the portion of the coupler-retaining means of the second housing part comprises one or more segment-retaining concave interior cavity wall portion(s) adapted to rotatably retain a coupler segment in said second housing part.

15. The coupling device of claim 14 wherein the one or more segment-retaining concave cavity wall portion(s) of said second housing part is or are adapted to rotatably restrain and rotatably restrain(s) a coupler segment therein from moving in any linear direction when said second segment is in a said first position.

16. The coupling device of claim 14 wherein said second housing part has a pair of at least partially opposed extensions, each extension having a said concave cavity wall portion which at least partially faces and is at least partially opposed to the other of said concave cavity wall portions of said pair, and wherein said second coupler segment has two at least partially opposed convex outer wall surface portions rotatingly slip fit engaged by said concave cavity wall portions of said extensions.

17. The coupling device of claim 16 wherein each extension of said pair has an outer edge which defines a mouth between said pair of extensions, and the coupler segment-retaining concave cavity wall portions of said pair have an arcuate outer mareginal edge portion which extends a sufficient distance toward said mouth as to cooperatively and rotatably retain said second segment in said extensions of said housing part when said coupler is in a said first position, and said coupler in said cavity when said coupler is in a said second position.

18. The coupling device of claim 16 wherein each housing part has a pair of at least partially opposed extensions and each extension of each pair includes a portion of said coupler retaining means and has an outer edge which defines a mouth between said pair of extensions, and the coupler segment-retaining concave cavity wall portions of said pair have an arcuate outer marginal edge portion which extends a sufficient distance toward said mouth as to cooperatively rotatably retain said segment in said extensions of said housing part when said coupler is in a said first position, and said coupler in said cavity when said coupler is in a said second position.

19. The coupling device of claim 16 wherein said one or more concave cavity wall portion(s) and said one or more convex outer wall portions include a corresponding portion of a surface of revolution.

20. The coupling device of claim 16 wherein the housing interior cavity wall is spherical, the coupler has an outer surface wall comprised of spherical outer surface wall portions of the coupler segments, and the mating/parting lines each comprise a continuous line by two pairs of 180° circular arcs generated by a 45° radical extending from the center of said coupler, the two arcs of said one pair being parallel to each other and facing in the same direction, and the two arcs of the other pair being parallel to each other and facing in the opposite direction to and being in different planes than said arcs of the other pair.

21. The coupling device of claim 14 wherein the coupler has one or more convex outer surface wall portion(s) and each coupler segment has a portion of and the coupler segments together form the coupler's convex outer surface wall portion(s) which in size and shape juxtaposedly substantially corresponds to the size and shape of a portion of the cavity wall portion with which it is in slip fit engagement.

22. The coupling device of claim 21 wherein each segment's said convex outer surface wall portion(s) substantially corresponds in size and shape to each housing part's said concave cavity wall portion, and when said housing parts are in said uncoupled first position, each segment's outer surface wall portion(s) positionally substantially corresponds to the cavity wall portion(s) of the respective housing part within which it is located, and when said housing parts are in a coupled second position, said segment's outer surface wall portions do not positionally substantially correspond to the respective housing part's cavity wall portion(s).

23. The coupling device of claim 22 wherein said corresponding portions of surface of revolution are selected from the group consisting of spherical, cylindrical, conical, ellipsoidal, oval, oblong and combinations thereof.

24. The coupling device of claim 14 wherein said housing parts and said coupler segments include alignment means adapted to limit mating and parting of said housing parts and said coupler segments to but one linear path.

25. A coupling device, comprised of
a housing having an interior cavity wall which defines a cavity adapted to retain a coupler therein,
a coupler rotatably retained in slip fit engagement within the cavity, the coupler being comprised of first and second segments mated along a mating-/parting line, and
means for rotating the coupler within the cavity,
the housing being comprised of first and second housing parts mated along a mating/parting line, each housing part having one or more segment-retaining concave interior cavity wall portion(s) adapted to rotatably retain a coupler segment in the housing part,
each coupler segment having one or more convex outer surface wall portion(s) rotatingly slip fit engaged by said concave cavity wall portions of each housing part,
said coupling device being coupled or not, depending on the position of said coupler in said cavity, said coupling device being uncoupled when said coupler is in a first position wherein said mating-/parting lines positionally substantially correspond and said device being coupled when said coupler is in a second position wherein said mating/parting lines positionally do not substantially correspond, said means for rotating being adapted to effect rotation of said coupler to a said first position and to a said second position.

26. The coupling device of claim 25 wherein said mating/parting lines of said housing and coupler have substantially the same configuration, and the one or more segment-retaining concave cavity wall portions of each housing part is adapted to rotatably restrain and rotatably restrains a coupler segments therein from moving in any linear direction when said segments are in a said first position.

27. The coupling device of claim 26 wherein each housing part has a pair of at least partially opposed extensions, each extension of one pair having a said concave cavity wall portion which at least partially faces and is at least partially opposed to the other of said concave cavity wall portions of said pair, and wherein one of the coupler segments has two at least partially opposed convex outer wall surface portions rotatingly slip fit engaged by said concave cavity wall portions of said extensions.

28. The coupling device of claim 27 wherein each extension of said one pair has an outer edge which defines a mouth between said pair of extensions, and the coupler segment-retaining concave cavity wall portions of said pair have an arcuate outer marginal edge portion which extends a sufficient distance toward said mouth as to cooperatively rotatably retain said segment in said extensions of said housing part when said coupler is in said first portion, and said coupler in said cavity when coupler is in said second position.

29. The coupling device of claim 25, 26, 27 or 28 wherein the housing interior cavity wall is spherical, the coupler outer surface wall comprised of the convex outer surface wall portions of the coupler segments is spherical, and the mating/parting lines each comprise a continuous line formed by two pairs of 180° circular arcs generated by a 45° radial extending from the center of said coupler, the two arcs of said one pair being parallel to each other and facing in the same direction, and the two arcs of the other pair being parallel to each other and facing in the opposite direction to and being in different planes than said arcs of the other pair.

30. The coupling device of claim 26 wherein each housing part is C-shaped and has a back wall which in turn has extensions extending therefrom, said extensions having outer edge portions which define a mouth between said extensions and each extension having a coupler segment-retaining concave interior cavity wall portion therein, an outer marginal edge portion of which extends a sufficient distance toward said mouth as to cooperatively and rotatably retain a said coupler segment therein when said coupler is in said first position in said housing.

31. The coupling device of claim 25 or 26 wherein each coupler segment has a portion of and the coupler segments together form the coupler's convex outer surface wall which in size and shape juxtaposedly substantially corresponds to that of the cavity wall, each segment's outer surface wall portion(s) substantially corresponds in size and shape to each housing part's cavity wall portion, and when said housing parts are in said uncoupled first position, each segment's outer surface wall portion(s) positionally substantially corresponds to the cavity wall portion(s) of the respective housing part within which it is located, and when said housing parts are in a coupled second position, said segment's outer surface wall portions do not positionally substantially correspond to the respective housing part's cavity wall portions.

32. The coupling device of claim 25 or 26 wherein said one or more concave cavity wall portion(s) and said one or more convex outer wall portion(s) include a corresponding portion of a surface of revolution.

33. The coupling device of claim 32 wherein said corresponding surfaces of revolution are selected from the group consisting of spherical, cylindrical, conical, ellipsoidal, oval, oblong and combinations thereof.

34. The coupling device of claim 25 or 26 wherein a segment is rotatable about a fixed axis common to said segment and a housing part.

35. A coupling device, comprised of
a housing having an interior cavity wall which defines a cavity adapted to retain a coupler therein,
a coupler rotatably retained in slip fit engagement within the cavity, the coupler being comprised of first and second segments mated along a mating-/parting line,
means for rotating the coupler within the cavity,
the housing being comprised of first and second housing parts mated along a mating/parting line, each housing part having one or more segment-retaining concave interior cavity wall portion(s) adapted to rotatably retain a coupler segment in the housing part in a first position,
each coupler segment having a face, and one or more convex outer surface wall portions(s) rotatingly slip fit engaged by said one or more concave cavity wall portions(s) of each housing part,
said mating/parting lines of said housing and coupler having substantially the same configuration,
said housing parts being uncoupled when said segments are in a said first position wherein said mating/parting lines positionally substantially correspond and each of said respective segment's one or more convex outer surface wall portion(s) is or are so retained by only one of the respective housing parts and each segment faces the other of the housing parts, and said housing parts being coupled when said coupler segments, by rotation, are in a second position wherein said mating/parting lines positionally do not substantially correspond, and one or more convex wall portions of each segment is or are in slip fit engagement with one or more of said concave interior cavity wall portion(s) of both housing parts, said means for rotating being adapted to effect rotation of said segments to a said first position and to a said second position.

36. The coupling device of claim 35 wherein the one or more segment-retaining concave cavity wall portion(s) of each housing part is or are adapted to rotatably restrain and rotatably restrain(s) a coupler segment therein from moving in any linear direction when said segments are in a said first position.

37. The coupling device of claim 36 wherein each housing part has a pair of at least partially opposed extensions, each extension of one pair having a said concave cavity wall portion which at least partially faces and is at least partially opposed to the other of said concave cavity wall portions of said pair, and wherein one of the coupler segments has two at least partially opposed convex outer wall surface portions rotatingly slip fit engaged by said concave cavity wall portions of said extensions.

38. The coupling device of claim 37 wherein each extension of said one pair has an outer edge which defines a mouth between said pair of extensions, and the coupler segment-retaining concave cavity wall portions of said pair have an arcuate outer marginal edge portion which extends a sufficient distance toward said mouth as to cooperatively rotatably retain said segment in said extensions of said housing part when each coupler is in said first position, and said coupler in said cavity when said coupler is in said second position.

39. The coupling device of claim 35 or 36 wherein housing cavity wall is spherical, the coupler outer surface wall is spherical, and the mating/parting lines each comprise a continuous line formed by two pairs of 180° circular arcs generated by a 45° radial extending from the center of said coupler, the two arcs of said one pair being parallel to each other and facing in the same direction, and the two arcs of the other pair being parallel to each other and facing in the opposite direction to and being in different planes than said arces of the other pair.

40. The coupling device of claim 35 wherein said one or more concave cavity wall portion(s) and said one or more convex outer wall portion(s) include a corresponding portion of a surface of revolution.

41. The coupling device of claim 40 wherein said corresponding surfaces of revolution are selected from the group consisting of spherical, cylindrical, conical, ellipsoidal oval, oblong and combinations thereof.

42. A coupling device, comprised of
a housing having an interior cavity wall which defines a cavity adapted to retain a coupler therein,
a coupler rotatably retained in slip fit engagement within the cavity, the coupler being comprises of first and second segments mated along a mating-/parting line, and
means for rotating the coupler within the cavity wall about a fixed axis,
the housing being comprised of first and second housing parts mated along a mating/parting line, each housing part having a pair of at least partially opposed extensions, each extension of one pair having one or more segment-retaining spherical interior cavity wall portion(s) adapted to rotatably retain a coupler segment in the housing part in a first position such that while it is so retained it is restrained from moving in any linear direction yet is rotatable about said axis,
each coupler segment having two at least partially opposed spherical outer surface wall portions(s) rotatingly slip fit engaged by said concave cavity wall portions of each housing part,
said mating/parting lines of said housing and coupler each comprising a continuous line formed by two pairs of 180° circular arcs generated by a 45° radial extending from the center of said coupler, the two arcs of said one pair being parallel to each other and facing in the same direction, and the two arcs of the other pair being parallel to each other and facing in the opposite direction to and being in different planes than said arcs of the other pair, said coupling device being coupled or not depending on the position of said coupler in said cavity, said coupling device being uncoupled when said coupler is in a first position wherein said mating/parting lines positionally substantially correspond and said device being coupled when said coupler is in a second position wherein said mating/parting lines positionally do not substantially correspond, said means for rotating being adapted to effect rotation of said coupler to a said first position and to a said second position.

43. The coupling device of claim 42 wherein each extension of said one pair has an outer edge which defines a mouth between said pair of extensions, and the coupler segment-retaining spherical cavity wall portions of said pair have an arcuate outer marginal edge portion which extends a sufficient distance toward said mouth as to cooperatively rotatably so retain and restrain said segment in said extensions of said housing part when said coupler is in said first position, and said coupler in said cavity when said coupler is in said second position.

44. The coupling device of claim 1 or 42 wherein each housing part has a channel which communicates with said cavity, said coupler has a bore extending therethrough and which, depending on the coupler's position within the cavity, is simultaneously communicable with each housing part channel, said device being adapted such that said bore is not in communication with and said coupler blocks said housing part channels when said coupler is in a first position, and such that said bore is in communication with said channel when said coupler is in a second position.

45. The coupling device of claim 44 wherein said device is also adapted such that said bore is not in communication with and said coupler blocks said channel when said coupler is in another second position.

46. The coupling device of claim 1 or 42 wherein each of said housing parts includes means for connecting an item thereto, said item being selected from the group consisting of a structural item, and an item adapted to flow or transport fluid or energy therethrough or therealong, such that when a said item is connected to each housing part, the item are not coupled to each other when said coupler segments are in a said first position and are coupled to each other when said coupler segments are in a said second position.

47. The coupling device of claim 1 or 42 wherein the means for rotating the coupler include electromagnetic actuation means.

48. The coupling device of claim 1 or 42 wherein the coupler is comprised of coupler segments which are nearly identical, and/or said housing parts are nearly identical.

49. A coupling device, comprised of
a housing having an interior cavity wall which defines a cavity adapted to retain a coupler therein,
a coupler rotatably retained in slip fit engagement within the cavity, the coupler being comprised of mated first and second segments, each having a face, and
means for rotating the coupler within the cavity,
the housing being comprised of mated first and second housing parts, each having one or more concave interior cavity wall portion(s) adapted to rotatably retain a coupler segment in the housing part cavity wall portion(s) in a first position wherein it is rotatable about at least one axis,
each coupler segment having a face, and one or more convex outer surface wall portion(s) adapted to be rotatingly slip fit engaged by said one or more concave cavity wall portion(s) of each housing part,
said housing parts being uncoupled when said segments are in a said first position wherein each of said respective segment's one or more convex outer surface wall portion(s) is so retained by only one of the respective housing parts and faces the other of the housing parts, and said housing parts being coupled when said segments, by rotation, are in a second position wherein one or more of the convex wall portion(s) of each segment is or are in slip fit engagement with one or more of said concave interior cavity wall portion(s) of both housing parts, said means for rotating being adapted to effect rotation of said coupler to a said first position and to a said second position.

50. The coupling device of claim 49 wherein the one or more segment retaining concave cavity wall portion(s) of each housing part is or are adapted to rotatably restrain and rotatably restrain(s) a coupler segment from moving in any linear direction therein when said segments are in a said first position.

51. A coupling device, comprised of
a housing having an interior cavity wall which defines a cavity adapted to retain a coupler therein,
a coupler rotatably retained in slip fit engagement within the cavity, the coupler being comprised of first and second mated segments,
the housing being comprised of first and second mated housing parts, each having one or more coupler-retaining concave interior cavity wall portion(s) adapted to rotatably retain the coupler segment in a housing or part in a first position wherein it is restrained from moving in any linear direction, yet is rotatable about a least one axis.
each coupler segment having one or more convex outer surface wall portion(s) adapted to be rotatingly slip fit engage said concave cavity wall portion(s) of each housing part,
said housing parts being uncoupled when said segments are in a said first position wherein each respective segment is within a respective housing part, and said housing parts being coupled when said coupler, is in a second position wherein one or more convex wall portions of the of the first segment is or are in slip fit engagement with one or more of said concave interior cavity wall portion(s) of the second housing parts, and one or more of said convex wall portions of the second segment is or are in slip fit engagement with one or more of said concave interior cavity wall portion(s) of the first housing part.

52. The coupling device of claim 51 wherein each housing part has a pair of at least partially opposed extensions, each extensions of one pair having a said concave cavity wall portion which faces and is at least partially opposed to the outer of said concave cavity wall portion of said pair, and wherein one of the coupler segments has two at least partially opposed convex outer wall surface portions.

53. The coupling device of claim 52 wherein each extension of said one pair has an outer edge which defines a mouth between said pair of extensions, and the coupler segment-retaining concave cavity wall portions of said pair have an arcuate outer marginal edge portion which extends a sufficient distance toward said mouth as to cooperatively retain said segment in said first position, and said coupler in said cavity when said coupler is in said second position.

54. The coupling device of claim 51 wherein said cavity wall portion(s) and said coupler convex surface wall portion(s) each have a similar shape selected from the group consisting of spherical, cylindrical, conical, ellipsoidal, oval, oblong and combinations thereof.

55. A coupling device, comprised of
a housing having an interior cavity wall which defines a cavity adapted to retain a coupler therein,
a rotatable coupler rotatably retained in slip fit engagement within the cavity, the coupler being comprised of mated first and second segments,
the housing being comprised of mated first and second housing parts, each housing part having means for rotatably retaining the coupler in the housing in a position wherein it is rotatable about at least one axis, each housing part having one or more concave interior cavity wall portions,
the coupler segments each having one or more convex outer surface wall portion(s) adapted to be rotatingly slip fit engaged by said one or more concave cavity wall portion(s) of each housing part,
said housing parts being uncoupled when said coupler is in a first position wherein the retained convex outer wall portion(s) of each respective segment is or are within only one of the respective housing parts, and said housing parts being coupled when said coupler is in a second position wherein the convex outer wall portion(s) of each respective segment is or are in slip fit engagement with one or more of said concave interior cavity wall portion(s) of each of said first and second housing parts.

56. The coupling device of claim 55 wherein the coupler is cylindrically-shaped and is moveable in a linear direction along the axis about which it is rotatable.

57. The coupling device of claim 55 wherein said concave interior cavity wall portion(s) of each housing part is or are adapted to slip fit engage and rotatably retain a coupler segment therein.

58. A method of coupling a coupling device which comprises, providing a coupling device having a housing in turn comprised of two or more mated housing parts, each housing part having an interior cavity wall portion which portions together form a housing cavity adapted to house a coupler therein, providing each of said cavity wall portions with a portion of a concave surface of revolution, providing a coupler comprised of two or more mated coupler segments, each having an outer surface wall which includes a portion of a convex surface of revolution, said cavity wall and coupler portions of surfaces of revolution being adapted to slip-fit engage each other, providing means for rotating, and means for rotatably retaining the coupler within the cavity, and coupling the device by rotating the coupler from a first position wherein the coupler does not interfere with parting or decoupling of the housing parts, to a second position wherein the coupler prevents parting of and thereby couples the housing parts.

59. The method of claim 58 wherein there is included the steps of providing that the housing parts have a mating/parting line and the coupler has a mating/parting line, providing that the respective mating/parting lines are adapted to positionally substantially correspond, and the coupling step includes rotating the coupler from the first position wherein the mating/parting lines positionally substantially correspond, to a second position wherein they do not.

* * * * *